(12) United States Patent
Kitahara et al.

(10) Patent No.: US 7,267,887 B2
(45) Date of Patent: Sep. 11, 2007

(54) COMPOSITE MOLDING WITH ADHESIVE COMPOSITION LAYER COMPRISING CONJUGATED DIENE POLYMER HAVING CYCLIC STRUCTURE, AND COATING MATERIAL

(75) Inventors: Shizuo Kitahara, Chiyoda-ku (JP); Yasushi Tanaka, Chiyoda-ku (JP); Atsushi Hayashi, Chiyoda-ku (JP)

(73) Assignee: Zeon Corporation, Tokyo (JP)

( * ) Notice: Subject to any disclaimer, the term of this patent is extended or adjusted under 35 U.S.C. 154(b) by 152 days.

(21) Appl. No.: 10/492,821

(22) PCT Filed: Oct. 16, 2002

(86) PCT No.: PCT/JP02/10735

§ 371 (c)(1),
(2), (4) Date: Jul. 16, 2004

(87) PCT Pub. No.: WO03/033255

PCT Pub. Date: Apr. 24, 2003

(65) Prior Publication Data

US 2005/0003220 A1  Jan. 6, 2005

(30) Foreign Application Priority Data

Oct. 16, 2001 (JP) ............... 2001-318589
Dec. 7, 2001 (JP) ............... 2001-374319
Mar. 27, 2002 (JP) ............... 2002-090007
Apr. 9, 2002 (JP) ............... 2002-107123

(51) Int. Cl.
*C08L 51/04* (2006.01)

(52) U.S. Cl. .................. 428/521; 428/522; 525/74

(58) Field of Classification Search ......... 428/518, 428/519, 520, 522, 521; 525/74
See application file for complete search history.

(56) References Cited

U.S. PATENT DOCUMENTS

| | | | | |
|---|---|---|---|---|
| 3,393,176 A | * | 7/1968 | Vervloet | ............... 525/236 |
| 3,431,235 A | | 3/1969 | Lubowitz | |
| 3,995,099 A | * | 11/1976 | Gaylord | ............... 526/271 |
| 4,242,471 A | | 12/1980 | Lal | |
| 5,043,395 A | | 8/1991 | Oshima et al. | |
| 5,446,092 A | * | 8/1995 | Nishikawa et al. | ............... 525/66 |
| 2005/0003220 A1 | * | 1/2005 | Kitahara et al. | ............... 428/521 |
| 2005/0209412 A1 | * | 9/2005 | Kitahara et al. | ............... 525/331.9 |
| 2006/0063890 A1 | * | 3/2006 | Kitahara et al. | ............... 525/191 |

FOREIGN PATENT DOCUMENTS

| | | | | |
|---|---|---|---|---|
| DE | 3436556 A1 | * | 4/1986 | |
| JP | 57-145103 | * | 9/1982 | |
| JP | 58-152063 | * | 9/1993 | |

* cited by examiner

*Primary Examiner*—D. Lawrence Tarazano
(74) *Attorney, Agent, or Firm*—Birch, Stewart, Kolasch & Birch, LLP

(57) ABSTRACT

A shaped composite article comprising a substrate and an adherend, which are comprised of different materials and are bonded together through a layer of an adhesive composition comprising as the main ingredient (i) a cyclic structure-containing conjugated diene polymer having a degree of cyclization of 30-95%, or (ii) a modified cyclic structure-containing conjugated diene polymer having a degree of cyclization of 30-95%, and having added thereto 0.1-20 wt. % of an $\alpha,\beta$-ethylenically unsaturated carboxylic acid anhydride, wherein the ratio of {amount of (I)/[amount of (I)+ amount of (II)]} is at least 60 wt. %, where (I) is an acid anhydride group added and (II) is a dicarboxylic acid group formed by hydrolysis of an acid anhydride group (I).

15 Claims, No Drawings

COMPOSITE MOLDING WITH ADHESIVE COMPOSITION LAYER COMPRISING CONJUGATED DIENE POLYMER HAVING CYCLIC STRUCTURE, AND COATING MATERIAL

TECHNICAL FIELD

This invention relates to a shaped composite article comprising a substrate and an adherend, which are comprised of different materials, wherein the adherend is adhered onto the substrate through an adhesive composition layer comprising as the main ingredient a conjugated diene polymer having cyclic structures within the molecule. It further relates to a coating material comprising a conjugated diene polymer having cyclic structures within the molecule and having been modified with an anhydride of an $\alpha,\beta$-ethylenically unsaturated carboxylic acid.

BACKGROUND ART

In many cases, adhesion of a substarte to an adherend comprised of a material different from the substrate is difficult.

For example, a shaped article made of a hydrocarbon polymer, especially a polyolefin resin such as polypropylene or polyethylene, is used in combination with other different materials such as metals or fabrics for automobile parts, household appliances and construction materials. Further, a polyolefin resin used as a corrosion resistant material and a light-weight structural material is used as a laminate with a steel sheet or an aluminum sheet. However, polyolefin resins such as polypropylene and polyethylene are non-polar and have a low solubility parameter (small sp value), and hence, are difficult to adhere to different materials such as metals, for example, iron and aluminum, and glass, ceramics, fabrics and polar polymers.

To enhance the adhesion of a non-polar hydrocarbon polymer, a proposal has been made wherein one or both of the non-polar hydrocarbon polymer and a different material to be adhered, are pre-treated, or coated with a primer. However, a high adhesion strength was difficult to obtain by this proposed method, and, the adhesion effect varies depending upon the material compositions of the particular combination of materials to be adhered, and the applicable adherend materials are limited.

As another attempt for adhesively bonding a polyolefin resin to a different material without pre-treatment or coating with a primer, a composite article has been proposed which is made by adhering a polyolefin shaped article to a different material having a polar group via an adhesive layer comprised of chlorinated polypropylene having a chlorine content of 20 to 30% by weight, a styrene-ethylene-butylene-styrene block copolymer and a hydrogenated terpene resin (Japanese Examined Patent Publication [hereinafter abbreviated to as "JP-B"] No. H6-94207). However, in the case when the polyolefin shaped article to be adhered is made of a crystalline polyolefin resin such as polyethylene or polypropylene, the adhesion strength is still not high. Further, in the case when the different material having a polar group to be adhered to the polyolefin shaped article has a relatively small sp value such as polyethylene terephthalate or polymethyl methacrylate, the adhesion strength is also not satisfactory.

Polyolefin rubbers such as an ethylene-non-conjugated diene copolymer (EPDM), and polyolefin resins such as polyethylene and polypropylene are non-polar and have a low solubility parameter (small sp value), and hence, these polyolefin rubbers and resins are difficult to adhere to a polar polymer having a large sp value. Especially crystalline hydrocarbon polymers such as polypropylene and polyethylene have a high degree of crystallinity, and hence, are difficult to adhere to polyolefin elastomers and non-crystalline polyolefin resins even though these polyolefin elastomers and non-crystalline polyolefin resins have a sp value approximately equal to those of the crystalline hydrocarbon polymers.

To enhance the adhesion between polyolefin rubber and resin compositions, several proposals have been made, which include, for example, a method wherein an adhesive surface of vulcanized EPDM rubber is subjected to a blasting treatment to be thereby roughened, and an adhesive and a thermoplastic resin powder are applied to the roughened surface, and then, a polyester elastomer or a polyolefin elastomer is adhered onto the adhesive-applied surface (Japanese Unexamined Patent Publication [hereinafter abbreviated to as "JP-A"] No. H6-47816); a method wherein a carboxyl group-containing compound or talc is incorporated in a resin composition to be adhered to a polyolefin rubber (JP-A H9-171351); a method wherein an ethylene-1-octene copolymer is incorporated in a thermoplastic elastomer, and the resulting mixture is adhered to a polyolefin rubber (JP-A H9-40814); a method wherein a resin having a polar group such as a hydroxyl group is used as the resin composition to be adhered to a polyolefin elastomer (JP-A H8-244068). However, even though these proposals are adopted, the adhesion strength is not sufficiently high and the kind of resin compositions to be adhered to a polyolefin rubber is limited.

Further, a method has been proposed wherein a polar resin such as a polyamide resin or an ABS resin is adhesively bonded to a vulcanized rubber such as isoprene rubber or ethylene-propylene rubber with an adhesive comprising as the basic ingredient a mixture of polyvinyl alcohol modified with an aldehyde, or a resol-type phenolic resin. This proposed method has a problem such that the adhesion strength is still not sufficiently high and the phenolic compound is not satisfactory from a viewpoint of environmental health.

It is known that isoprene rubbers such as natural rubber and synthetic isoprene rubber are easily cyclized in the presence of an acid catalyst. Several attempts have been made for applying the cyclized isoprene rubbers for a coating material.

For example, a printing ink or coating composition applied for a polyolefin film or shaped article has been proposed which comprises as a vehicle resin a cyclized rubber made by cyclizing a conjugated diene polymer or copolymer having a low molecular weight, and optional ingredients such as a plasticizer and a dispersing agent (JP-A S51-12827).

Further it is taught in JP-A S51-12827 that, when a surface of a polyolefin shaped article is treated with a composition comprising an ingredient selected from a halogenated polyolefin, a halogenated rubber and a cyclized rubber, and a mixed solvent containing a terpene solvent, good coatability and printability and good adhesion to an adherend can be imparted to the surface thereof.

Another proposal of making a cyclized rubber by cyclizing a low-molecular-weight diene polymer has been made wherein a modified isoprene rubber prepared by modifying a low-molecular-weight isoprene polymer having a high cis-1,4-bond content with maleic anhydride or its derivatives is used as the rubber to be cyclized (JP-A S57-145103). It is described in this patent publication that the resulting cyclized rubber has improved adhesion to a polyolefin resin and improved compatibility with a polar resin, and therefore, is suitable for a printing ink and a coating liquid.

As explained above, a conjugated diene polymer having cyclic structures and modified polymers thereof have been proposed for use as a material for a coating liquid or an ink to be applied for a polyolefin resin. However, the adhesion has not been improved to the desired extent, and hence, a further improvement is eagerly desired.

DISCLOSURE OF THE INVENTION

A primary object of the present invention is to provide a shaped composite article comprising a substrate and an adherend, which are strongly bonded together even without a pre-treatment, wherein the combination of substrate with adherend is, for example, a combination of a shaped article of a crystalline hydrocarbon polymer with a shaped article of a non-crystalline hydrocarbon polymer, or a combination of a shaped article of a hydrocarbon polymer with a shaped article of a different material, or a combination of a hydrocarbon polymer having a small solubility parameter (sp value) with a polymer having a large solubility parameter (sp value).

Another object of the present invention is to provide a coating material exhibiting an improved adhesion to various resins and resin articles.

The present inventors made extensive researches to solve the above-mentioned problems of the prior art, and have found that, by using an adhesive composition comprising as the main ingredient a conjugated diene polymer having cyclic structures with a specific range of cyclization degree, a shaped article of a crystalline hydrocarbon polymer and a shaped article of a non-crystalline hydrocarbon polymer can be strongly bonded together; and further that, by using an adhesive composition comprising as the main ingredient a modified conjugated diene polymer having cyclic structures with a specific range of cyclization degree and having added thereto a specific amount of an α,β-ethylenically unsaturated carboxylic acid compound, a shaped article of a non-polar hydrocarbon polymer and a shaped article of a polar polymer, which shaped articles have greatly different solubility parameters (sp values), can be strongly bonded together, and further, a shaped article of a hydrocarbon polymer and a shaped article of a different material other than a hydrocarbon polymer can also be strongly bonded together. On the basis of these findings, the present invention can be completed.

In accordance with the present invention, there is provided a shaped composite article comprising a substrate and an adherend, wherein the substrate and the adherend are comprised of different materials, and the adeherend is adhered onto the substrate through a layer of an adhesive composition; and said adhesive composition comprises as the main ingredient (i) a conjugated diene polymer having cyclic structures which has a degree of cyclization in the range of 30 to 95%, or (ii) a modified conjugated diene polymer having cyclic structures which has a degree of cyclization in the range of 30 to 95%, and having added thereto 0.1 to 20% by weight of an α,β-ethylenically unsaturated carboxylic acid compound.

In accordance with the present invention, there is further provided a coating material comprising a modified conjugated diene polymer having cyclic structures which has a degree of cyclization in the range of 30 to 95%, and having added thereto 0.1 to 10% by weight of an anhydride of an α,β-ethylenically unsaturated carboxylic acid, and the ratio of {amount of (I)/[amount of (I)+amount of (II)]} is at least 60% by weight, wherein (I) is an acid anhydride group added and (II) is a dicarboxylic acid group formed by hydrolysis of an acid anhydride group (I).

BEST OF MODE FOR CARRYING OUT THE INVENTION

I. Shaped Composite Article

The shaped composite article of the present invention comprises a substrate and an adherend, wherein the substrate and the adherend are comprised of different materials, and are adhesively bonded a layer of an adhesive composition comprising as the main ingredient a conjugated diene polymer having cyclic structures in the interior of molecule.

I-1. Adhesive Composition

The adhesive composition used for formation of the shaped composite article of the present invention comprises as the main ingredient (i) a conjugated diene polymer having cyclic structures which has a degree of cyclization in the range of 30 to 95% (which polymer is hereinafter referred to as "cyclic structure-containing conjugated diene polymer (i)" when appropriate), or (ii) a modified conjugated diene polymer having cyclic structures which has a degree of cyclization in the range of 30 to 95%, and having added thereto 0.1 to 20% by weight of an α,β-ethylenically unsaturated carboxylic acid compound (which polymer is hereinafter referred to as "modified cyclic structure-containing conjugated diene polymer (ii)" when appropriate).

By the term "the main ingredient" as used herein, we mean that the adhesive composition comprises at least 50% by weight of the cyclic structure-containing conjugated diene polymer (i) or the modified cyclic structure-containing conjugated diene polymer (ii). The content of (i) or (ii) is preferably at least 75% by weight.

The cyclic structure-containing conjugated diene polymer is obtained by subjecting a conjugated diene polymer to a cyclization reaction in a publicly known manner. The cyclic structure-containing conjugated diene polymer (i) and the modified cyclic structure-containing conjugated diene polymer (ii) contain cyclic structures in an amount such that the degree of cyclization is in a specific range. The degree of cyclization is a figure indicating the ratio of change of the amount of unsaturated bonds in the conjugated diene polymer due to the cyclization reaction. The degree of cyclization can be determined by measuring the amount of unsaturated bonds in the conjugated diene polymer before and after the cyclization reaction by proton NMR according to, for example, methods described in Manfred Gordon et al, Industrial and Engineering Chemistry, Vol. 43, No. 2, p386 (1951), and Yasuyuki Tanaka et al, J. Polymer Science: Polymer Chemical Edition, Vol. 17, p.3027 (1979). More specifically, proton peak areas attributed to the double bonds in the conjugated diene polymer are measured before and after the cyclization reaction. The degree of cyclization is calculated according to the following equation.

$$\text{Degree of cyclization (\%)} = 100 - X$$

wherein X is a ratio in percent of the peak area attributed to the double bonds as measured after the cyclization reaction, provided that the peak area attributed to the double bonds as measured before the cyclization reaction is 100.

The cyclic structure-containing conjugated diene polymer (i) and the modified cyclic structure-containing conjugated diene polymer (ii), used in the present invention, have a degree of cyclization in the range of 30 to 95% by weight, preferably 50 to 90% by weight and more preferably 60 to 85% by weight. When the degree of cyclization is too small or too large, the adhesive strength between the substrate and the adherend is poor.

The modified cyclic structure-containing conjugated diene polymer (ii), used in the present invention, has a structure such that an α,β-ethylenically unsaturated carboxylic acid compound has been added thereto. The amount of α,β-ethylenically unsaturated carboxylic acid compound added is in the range of 0.1 to 20% by weight, preferably 0.2 to 10% by weight and more preferably 0.3 to 5% by weight. When the amount of this compound added is too small or too large, the adhesive strength between the substrate and the adherend is poor.

The above-mentioned amount of α,β-ethylenically unsaturated carboxylic acid compound added in the modified cyclic structure-containing conjugated diene polymer (ii) means the amount in % by weight of said compound bound in the molecule of the modified cyclic structure-containing conjugated diene polymer (ii), which can be calculated according to the following equation.

Amount added (% by weight)=[acid value/(molecular weight of potassium hydroxide [56.11]×1000)]×(molecular weight of α,β-ethylenically unsaturated carboxylic acid compound/n)×100 wherein n is a valence of α,β-ethylenically unsaturated carboxylic acid compound. The acid value is defined by the weight (in milli-gram) of potassium hydroxide required for neutralization of the acid per gram of the modified cyclic structure-containing conjugated diene polymer (ii), and can be measured by titration.

The modified cyclic structure-containing conjugated diene polymer (ii) having an α,β-ethylenically unsaturated carboxylic acid compound added thereto can be prepared by modifying either the cyclic structure-containing conjugated diene polymer (i) or a conjugated diene polymer before cyclization thereof, with the α,β-ethylenically unsaturated carboxylic acid compound, or, by copolymerizing the α,β-ethylenically unsaturated carboxylic acid compound with the other monomers when a conjugated diene polymer is produced. In other words, the order of cyclization treatment and modification treatment with the α,β-ethylenically unsaturated carboxylic acid compound for the preparation of the modified cyclic structure-containing conjugated diene polymer (ii) is not particularly limited.

Thus, the modified cyclic structure-containing conjugated diene polymer (ii), used in the present invention, includes (ii-1) an addition product obtained by allowing the cyclic structure-containing conjugated diene polymer (i) to react with an α,β-ethylenically unsaturated carboxylic acid compound; (ii-2) a compound obtained by first allowing a conjugated diene polymer to react with an α,β-ethylenically unsaturated carboxylic acid compound, and then, cyclizing the thus-obtained reaction product; and (ii-3) a product obtained by cyclizing an addition copolymer of a conjugated diene monomer with an α,β-ethylenically unsaturated carboxylic acid compound. Of these, the addition product (ii-1) of the cyclic structure-containing conjugated diene polymer (i) obtained by reacting the polymer (i) with an α,β-ethylenically unsaturated carboxylic acid compound, and the compound (ii-2) obtained by cyclizing the conjugated diene polymer having an α,β-ethylenically unsaturated carboxylic acid compound added thereto are preferable because the addition of α,β-ethylenically unsaturated carboxylic acid compound is easy. The former addition product (ii-1) is especially preferable.

A conjugated diene polymer (hereinafter abbreviated to as "polymer (a)" when appropriate) constituting the cyclic structure-containing conjugated diene polymer (i) and the modified cyclic structure-containing conjugated diene polymer (ii), used in the present invention, is a polymer comprising units derived from a conjugated diene monomer as the main structural units. The polymer (a) includes a homopolymer of a conjugated diene monomer, a copolymer of at least two conjugated diene monomers, a copolymer of a conjugated diene monomer and other copolymerizable monomer, and natural rubber.

The content of conjugated diene monomer units in the polymer (a) is preferably at least 70% by weight, more preferably at least 80% by weight and especially preferably at least 95% by weight.

As specific examples of the conjugated diene monomer, there can be mentioned 1,3-butadiene, isoprene, 2,3-dimethyl-1,3-butadiene, 2-phenyl-1,3-butadiene, 1,3-pentadiene, 2-methyl-1,3-pentadiene, 1,3-hexadiene, 4,5-diethyl-1,3-octadiene, 3-butyl-1,3-octadiene and chloroprene. Of these, 1,3-butadiene and isoprene are preferable. Isoprene is especially preferable.

The polymer (a) may be copolymers made by copolymerization of a conjugated diene monomer with other copolymerizable monomer or monomers. As specific examples of the monomer copolymerizable with a conjugated diene monomer, there can be mentioned aromatic vinyl compounds such as styrene, α-methylstyrene, p-isopropylstyrene, p-phenylstyrene, p-methoxystyrene, p-methoxymethylstyrene, p-tert-butoxystyrene, chloromethylstyrene, 2-fluorostyrene, 3-fluorostyrene, pentafluorostyrene, vinyltoluene, vinylnaphthalene and vinylanthracene; olefin compounds such as propylene and isobutylene; nitrile compounds such as acrylonitrile and methacrylonitrile; acrylate compounds such as ethyl acrylate, butyl acrylate and 2-ethylhexyl acrylate; and sulfonic acid group-containing compounds such as 2-sulfoethyl methacrylate and 2-acrylamide-2-methylpropanesulfonic acid. Of these, aromatic vinyl compounds are preferable. Styrene and α-methylstyrene are especially preferable.

The polymer (a) preferably has a weight average molecular weight in the range of 10,000 to 800,000, more preferably 30,000 to 500,000 and especially preferably 50,000 to 300,000. When the weight average molecular weight is too small, the adhesive strength between the substrate and the adherend is poor. In contrast, when the weight average molecular weight is too large, an adhesive composition comprising as the main ingredient the cyclic structure-containing conjugated diene polymer (i) and the modified cyclic structure-containing conjugated diene polymer (ii) has a too high viscosity and is often difficult to uniformly coat as an adhesive on a substrate or an adherend.

The cyclic structure-containing conjugated diene polymer (i) and the modified cyclic structure-containing conjugated diene polymer (ii) is obtained by subjecting a conjugated diene polymer or a conjugated diene polymer having an α,β-ethylenically unsaturated carboxylic acid compound added thereto, to an internal cyclization reaction. The procedure for internal cyclization reaction is not particularly limited, and the internal cyclization reaction can be carried out by a known procedure wherein the conjugated diene polymer is contacted with a cyclization catalyst in an inert reaction medium.

As specific examples of the inert reaction medium, there can be mentioned aromatic hydrocarbons such as benzene, toluene, xylene and ethylbenzene; saturated hydrocarbons such as n-pentane, n-hexane, n-heptane, n-octane, n-nonane and n-decane; and alicyclic hydrocarbons such as cyclopentane, cyclohexane, cycloheptane and cyclooctane. Of these, hydrocarbons having a boiling point of at least 70° C. are preferable.

As specific examples of the cyclization catalyst, there can be mentioned sulfuric acid; organic sulfonic acids such as fluoromethanesulfonic acid, difluoromethanesulfonic acid and p-toluenesulfonic acid, and other organic sulfonic acid compounds such as anhydrides and esterified compounds thereof; Friedel-Crafts catalysts (Lewis acids) such as tin tetrachloride and titanium tetrachloride; metal halides such as boron trifluoride, boron trichloride, aluminum chloride, diethylaluminum monochloride, aluminum bromide, antimony pentachloride, tungsten hexachloride and iron chloride; and alkylaluminum halide/halogenated hydrocarbons such as ethylaluminum dichloride/benzyl chloride. The solvent used for polymerization for the production of conjugated diene polymer can be used as it is. That is, an acid catalyst can be added to a polymerization liquid as obtained upon completion of polymerization whereby the as-produced polymer is cyclized.

The reaction temperature and time for cyclization reaction, and the ratio of the polymer to be cyclized to the cyclization catalyst may be appropriately determined depending upon the intended degree of cyclization. In general, the reaction temperature is preferably in the range of 20 to 200° C., more preferably 50 to 150° C. and especially preferably 80 to 100° C. The reaction time is preferably in the range of 1 to 20 hours, more preferably 2 to 15 hours and especially preferably 3 to 10 hours.

The process for producing the modified cyclic structure-containing conjugated diene polymer (ii) used in the present invention includes, (1) a process wherein the cyclic structure-containing conjugated diene polymer (i), prepared as mentioned above, is reacted with an α,β-ethylenically unsaturated carboxylic acid compound to prepare an addition product; (2) a process wherein a conjugated diene polymer is reacted with an α,β-ethylenically unsaturated carboxylic acid compound to prepare an addition product, and then, the addition product is cyclized as mentioned above; and (3) a process wherein a conjugated diene monomer is copolymerized with an α,β-ethylenically unsaturated carboxylic acid compound to prepare an addition copolymer, and then, the addition copolymer is cyclized as mentioned above. The procedures and conditions adopted for cyclizing the addition product in the process (2) and the procedures and conditions adopted for cyclizing the addition copolymer in the process (3) are the same as those mentioned above as for the cyclization of a conjugated diene polymer.

The procedures and conditions for addition reaction for the preparation of the addition product in the processes (1) and (2), and the procedures and conditions for addition copolymerization in the process (3) will be described below.

In the case when a conjugated diene monomer is copolymerized with an α,β-ethylenically unsaturated carboxylic acid compound, a carboxylic acid-containing compound such as acrylic acid, methacrylic acid and itaconic acid, can be used as the α,β-ethylenically unsaturated carboxylic acid compound. The procedures and conditions for the copolymerization may be conventional.

The addition reaction of a conjugated diene polymer and a cyclized product thereof is not particularly limited, and general en-addition reaction and graft-polymerization can be adopted. The en-addition reaction and graft-polymerization can be carried out in a solution or an aqueous dispersion, or in a solid phase.

In the case when the addition reaction is carried out in a solution, a process can be employed wherein a conjugated diene polymer is dissolved in a solvent which is inert to the ethylenically unsaturated carboxylic acid compound, such as toluene or xylene, and a predetermined amount of the ethylenically unsaturated carboxylic acid compound is added to the solution where the addition reaction is carried out under a stream of nitrogen at a temperature of 80 to 190° C. for 1 to 20 hours. As specific examples of the solvent used for the addition reaction, there can be mentioned those which are recited above for the cyclization reaction.

In the case of a solid phase reaction, the addition can be carried out by conducting kneading using a twin screw extruder or a kneader at a reaction temperature of 180 to 200° C. for 2 to 60 minutes. During the kneading, a small amount (i.e., 5 to 10% by weight, based on the weight of the cyclized product) of a solvent having a high boiling point can be added, if desired.

The amount of α,β-ethylenically unsaturated carboxylic acid compound can be determined in consideration of the reaction efficiency. To promote the addition reaction, about 2 to 10% by weight, based on the weight of the α,β-ethylenically unsaturated carboxylic acid compound, of a radical initiator can be made present in a reaction mixture, if desired. As specific examples of the radical initiator, there can be mentioned peroxides such as di-tert-butyl peroxide, tert-butyl hydroperoxide, dicumyl peroxide, benzoyl peroxide, tert-butyl-peroxybenzoate, methyl ethyl ketone peroxide and di-tert-butyl-diperoxyphthalate; and azonitriles such as azobisisobutyronitrile.

By the term "the α,β-ethylenically unsaturated carboxylic acid compound" as used in the present invention, we mean α,β-ethylenically unsaturated carboxylic acids, anhydrides thereof and esterified products thereof. The α,β-ethylenically unsaturated carboxylic acid compound includes α,β-ethylenically unsaturated monocarboxylic acids, α,β-ethylenically unsaturated polycarboxylic acids, α,β-ethylenically unsaturated polycarboxylic acid anhydrides, esters of α,β-ethylenically unsaturated monocarboxylic acids, partial esters of α,β-ethylenically unsaturated polycarboxylic acids, and complete esters of α,β-ethylenically unsaturated polycarboxylic acids.

As specific examples of the α,β-ethylenically unsaturated carboxylic acid compound, there can be mentioned α,β-ethylenically unsaturated monocarboxylic acids such as acrylic acid, methacrylic acid and crotonic acid; α,β-ethylenically unsaturated polycarboxylic acids such as maleic acid, fumaric acid and itaconic acid; α,β-ethylenically unsaturated polycarboxylic acid anhydrides such as maleic anhydride, itaconic anhydride and aconitic anhydride; esters of α,β-ethylenically unsaturated monocarboxylic acids such as ethyl acrylate and butyl acrylate; partial esters of α,β-ethylenically unsaturated polycarboxylic acids such as monoethyl maleate and monomethyl fumarate; and complete esters of α,β-ethylenically unsaturated polycarboxylic acids such as diethyl maleate and dimethyl fumarate.

Of these, α,β-ethylenically unsaturated polycarboxylic acidanhydrides are preferable. α,β-ethylenically unsaturated dicarboxylic acid anhydrides are especially preferable. α,β-ethylenically unsaturated dicarboxylic acid anhydrides have a structure such that two carboxylic acid groups are bound to adjacent two carbon atoms, respectively, in the molecule, and form an acid anhydride structure in the molecule. As specific examples of such α,β-ethylenically unsaturated dicarboxylic acid anhydrides (B), there can be mentioned maleic anhydride, itaconic anhydride and aconitic anhydride. Of these, maleic anhydride is most preferable.

The amount of α,β-ethylenically unsaturated carboxylic acid compound is in the range of 0.1 to 20% by weight, preferably 0.2 to 10% by weight and more preferably 0.3 to 5% by weight, as mentioned above. However, in the case when an α,β-ethylenically unsaturated dicarboxylic acid anhydride is used, its amount added is preferably in the range of 0.1 to 10% by weight, more preferably 0.2 to 8% by weight and especially preferably 0.3 to 5% by weight, as mentioned above.

In the case when an α,β-ethylenically unsaturated carboxylic acid is used, the ratio of the amount of acid anhydride groups (I) added to the sum of the amount of acid anhydride groups (I) and the amount of dicarboxylic acid groups (II) formed by hydrolysis of an acid anhydride groups (I) is preferably at least 60% by weight, more preferably at least 70% by weight and especially preferably at least 80% by weight. The ratio of the amount of acid anhydride groups (I) can be determined by the ratio of peak intensity of acid anhydride group and carboxylic acid group as measured by infrared spectrophotometry. As the ratio of (I) to the sum of (I) and (II) is large, the adhesive composition exhibits a larger adhesion as a binder resin.

The cyclic structure-containing conjugated diene polymer (i) and the modified cyclic structure-containing conjugated diene polymer (ii), used in the present invention, may be hydrogenated provided that the effect of the invention can be substantially obtained.

The procedure for hydrogenation is not particularly limited and can be conventional. Usually the cyclic structure-containing conjugated diene polymer (i) and the modified cyclic structure-containing conjugated diene polymer (ii) are contacted with hydrogen in the presence of a hydrogenation catalyst.

As the hydrogenation catalyst, those which are generally used for hydrogenation of olefin compounds can be used. The hydrogenation catalyst includes, for example, heterogeneous catalysts including a metal such as nickel, palladium or platinum, or including solid catalysts comprised of a metal such as nickel, palladium or platinum, supported on carrier such as carbon, silica, diatomaceous earth, alumina or titanium oxide; and homogeneous catalysts including those which contain a metal of group 8 of the periodic table.

The hydrogenation reaction can be carried out under appropriate conditions selected from a hydrogen pressure of 1 to 150 atmospheric pressures, and a temperature of 0 to 200° C., preferably 20 to 150° C.

The cyclic structure-containing conjugated diene polymer (i) and the modified cyclic structure-containing conjugated diene polymer (ii) preferably have a weight average molecular weight in the range of 5,000 to 600,000, more preferably 22,000 to 370,000 and especially preferably 37,000 to 230,000 as measured by gel permeation chromatography and as expressed in terms of that of standard polystyrene.

The adhesive composition used in the present invention can contain, in addition to the cyclic structure-containing conjugated diene polymer (i) and the modified cyclic structure-containing conjugated diene polymer (ii), additives which are widely incorporated in adhesives, according to the need. The additive includes, for example, a filler such as calcium carbonate and titanium oxide, a plasticizer, a surface active agent (leveling agent), an ultraviolet absorber, a light stabilizer, an antioxidant, a dehydrating agent, an adhesion-imparting agent, a pot life strengthener (such as acetylacetone, methanol and methyl orthoacetate) and an anti-cissing agent.

The adhesive composition can further contain, in addition to the above-mentioned additives, a curing agent. The curing agent preferably includes compounds having at least two functional groups capable of reacting with an acid anhydride group and a carboxyl group, and, as specific examples thereof, there can be mentioned polyhydroxy compounds such as a polyepoxy compound, a polyester-polyol and a polyhydroxy-polyolefin.

The amount of the above-mentioned additives and curing agent is not particularly limited, but, the sum of the additives and the curing agent is preferably not larger than 100% by weight based on the weight of cyclic structure-containing conjugated diene polymer (i) and modified cyclic structure-containing conjugated diene polymer (ii) (namely not larger than 50% by weight based on the weight of the adhesive composition), and more preferably not larger than 50% by weight based on the weight of polymer (i) or polymer (ii).

The adhesive composition can be diluted with a solvent so as to control the viscosity thereof at the time of coating, and the thickness of coating formed from the adhesive composition. The solvent used for dilution includes, for example, aliphatic hydrocarbons such as n-heptane and n-hexane; alicyclic hydrocarbons such as cyclopentane and cyclohexane; aromatic hydrocarbons such as toluene and xylene; ketones such as methyl ethyl ketone and metyl isobutyl ketone; alcohols such as isopropanol and isobutanol; and esters. Of these, aliphatic hydrocarbons, alicyclic hydrocarbons, aromatic hydrocarbons and ketones are preferable in view of high solubility of the cyclic structure-containing polymer and high volatility. These solvents may be used either alone or as a combination of at least two thereof. The mixing ratio of the solvent and the amount of solvent can be appropriately chosen depending upon the particular kind of substrate and the procedure for making the composite article.

I-2 Substrate and Adherend, and Adhesion Thereof

A substrate and an adherend, which are adhesively bonded through the above-mentioned adhesive composition, are not particularly limited provided that the substrate and the adherend are comprised of different materials. However, the adhesive composition used in the present invention exhibits a noticeable adhesion effect in the case when one of a substrate and an adherend is a non-polar hydrocarbon polymer.

Typical examples of the combination of a substrate with an adherend, for which the adhesive composition of the present invention exhibits an enhanced adhesion effect, are (1) a combination of a shaped article of a non-polar hydrocarbon polymer with a shaped article of other different material, (2) a combination of a shaped article of a crystalline hydrocarbon polymer with a shaped article of a non-crystalline hydrocarbon polymer, and (3) a hydrocarbon polymer having a small solubility parameter (sp value) with a polar polymer having a large solubility parameter (sp value).

For the above-mentioned substrate/adherend combinations (1) and (3), an adhesive composition comprising the modified cyclic structure-containing conjugated diene polymer (ii) as the main ingredient is especially suitable. For the above-mentioned substrate/adherend combination (2), an adhesive composition comprising the cyclic structure-containing conjugated diene polymer (i) as the main ingredient is especially suitable.

The above-mentioned three substrate/adherend combinations will be specifically explained.

(1) Adhesion of Combination of Shaped Article of Non-Polar Hydrocarbon Polymer with Shaped Article of Other Different Material The non-polar hydrocarbon polymer used as a shaping material for one of a substrate and an adherend comprises, as the main structural units, repeating units derived by polymerization of a non-polar hydrocarbon compound. As specific examples of the non-polar hydrocarbon compound, there can be mentioned chainlike olefins such as ethylene, propylene and isobutylene; cyclic monoolefins such as cyclopentene and cyclohexene; conjugated dienes such as butadiene and isoprene; cyclic conjugated dienes such as cyclopentadiene and cyclohexadiene; vinyl alicyclic hydrocarbons such as vinylcyclohexane and vinyl cyclohexene; and vinyl aromatic hydrocarbons such as styrene.

As specific examples of the non-polar hydrocarbon polymer used as shaping material for one of a substrate and an adherend, there can be mentioned hydrocarbon rubbers such as polyisobutylene, an ethylene-propylene-diene copolymer rubber and natural rubber; ethylene-α-olefin copolymerized thermoplastic elastomers such as an ethylene-propylene copolymer and an ethylene-butene-1 copolymer; chainlike polyolefin resins such as polyethylene and polypropylene; norbornene resins such as ring-open polymerized norbornene polymers and hydrogenation products thereof, and norbornene addition polymers and copolymers; vinyl cyclic hydrocarbon resins such as polyvinylcyclohexane, polyvinylcycloheptane and polyvinylcyclohexene; and cyclic conjugated diene resins such as polycyclohexadiene and its hydrogenation product. These shaping materials may be composite materials comprised of a polymeric material with an organic or inorganic filler.

As specific examples of the different material to be adhered to the non-polar hydrocarbon polymer, there can be mentioned metal such as iron, aluminum, copper and silicon; ceramics such as glass and porcelain; and natural polymeric materials having a hydroxyl group, an amino group or an amide group, which are heat-resistant for adhesion, such as wood, paper, cellulosic fibers, protein fibers and inorganic fibers.

For the above-mentioned combination of a shaped article of a non-polar hydrocarbon polymer with a shaped article of a different material, an adhesive composition comprising the modified cyclic structure-containing conjugated diene polymer (ii) as the main ingredient is especially suitable.

(2) Adhesion of Shaped Article of Crystalline Hydrocarbon Polymer to Shaped Article of Non-Crystalline Hydrocarbon Polymer The crystalline hydrocarbon polymer, used as a shaping material for one of a substrate and an adherend, has a crystalline structure. That is, the crystalline hydrocarbon polymer is a non-polar polymer having a melting point equal to or higher than room temperature and consisting of carbon atoms and hydrogen atoms, and, as specific examples thereof, there can be mentioned polyethlene, polypropylene, polycyclohexene, syndiotactic polystyrene and syndiotactic 1,2-polybutadiene. These crystalline hydrocarbon polymers may be used as a composite material comprised of the crystalline hydrocarbon polymer with an organic or inorganic filler.

The non-crystalline hydrocarbon polymer, used as a shaping material for the other of a substrate and an adherend, is a non-polar polymer which does not have a crystalline structure, namely, does not have a melting point and consists of carbon atoms and hydrogen atoms. As specific examples of the non-crystalline hydrocarbon polymer, there can be mentioned hydrocarbon rubbers such as polyisobutylene, an ethylene-propylene-diene copolymer rubber and natural rubber; ethylene-α-olefin copolymerized thermoplastic elastomers such as an ethylene-propylene copolymer and an ethylene-butene-1 copolymer; norbornene polymers such as norbornene ring-open polymers and hydrogenation products thereof, and norbornene addition polymers and copolymers; vinyl cyclic hydrocarbon resins such as polyvinylcyclohexane, polyvinylcycloheptane and polyvinylcyclohexene; and cyclic conjugated diene polymers such as polycyclohexadiene and its hydrogenation product. These shaping materials may be used as a composite material comprised of the non-crystalline hydrocarbon polymer with an organic or inorganic filler.

For adhesion of a shaped article of a crystalline hydrocarbon polymer to a shaped article of a non-crystalline hydrocarbon polymer, an adhesive composition comprising the cyclic structure-containing conjugated diene polymer (i) as the main ingredient is suitable. In the case when both of the crystalline hydrocarbon polymer and the non-crystalline hydrocarbon polymer are non-polar hydrocarbon polymers consisting of carbon atoms and hydrogen atoms, an adhesive composition comprising the cyclic structure-containing conjugated diene polymer (i) as the main ingredient is suitable.

(3) Adhesion of Hydrocarbon Polymer Having Small Solubility Parameter(Sp Value) to Polar Polymer Having Large Solubility Parameter(Sp Value)

The hydrocarbon polymer, used for one of a substrate and an adherend, comprises, as the main structural units, repeating units derived by polymerization of a hydrocarbon compound. As specific examples of the hydrocarbon compound, there can be mentioned chainlike olefins such as ethylene, propylene and isobutylene; cyclic monoolefins such as cyclopentene and cyclohexene; conjugated dienes such as butadiene and isoprene; cyclic conjugated dienes such as cyclopentadiene and cyclohexadiene; vinyl alicyclic hydrocarbons such as vinylcyclohexane and vinyl cyclohexene; vinyl aromatic hydrocarbons such as stylene; norbornenes such as norbornene, dicyclopentadiene and tetracyclododecene; and derivatives of the above-recited hydrocarbon compounds. Of these hydrocarbon polymers, those which have an sp value in the range of 7.8 to 8.5 $(cal/cm^3)^{1/2}$ are used for the substrate and the aherend.

The sp value means a value ($\delta$) defined by the equation:

$$\delta = (\Delta H/V)^{1/2}$$

wherein $\Delta H$ is molar heat of evaporation, and V is molar volume. The compatibility of two substances (i.e., solubility of one substance in the other substance) increases as the difference of sp values of the two substances decrease. The unit for sp value adopted in this specification is $(cal/cm^3)^{1/2}$ unless otherwise specified. The sp values of polymers used in the present invention are determined according to the method described in High Polymer Data Handbook-Fundamental Edition, 1986 (Society of Polymer Science, Japan) and Yujiro Sakurauchi, Polymer Chemistry Kyoushitsu, second edition, Sankyo Publisher, Japan.

As specific examples of the hydrocarbon polymer having an sp value in the range of 7.8 to 9.0 $(cal/cm^3)^{1/2}$, there can be mentioned hydrocarbon rubbers such as polyisobutylene (sp value=8.1) and natural rubber (sp value=8.3); chainlike polyolefin resins such as polyethylene (sp value=7.9) and polypropylene (sp value=8.2); norbornene resins (sp value=8.0 to 9.0) such as ring-open polymers of the above-recited norbornenes and hydrogenation products thereof, addition polymers of norbornenes and addition copolymers of the norbornenes with copolymerizable compounds; vinyl cyclic hydrocarbon resins (sp value=8.0 to 9.0) such as polyvinylcyclohexane, polyvinylcycloheptane and polyvinylcyclohexene; and cyclic conjugated diene resins (sp value=8.0 to 9.0) such as polycyclohexadiene and its hydrogenation product.

The polar polymer having a large sp value, used as shaping material to be adhered to the hydrocarbon polymer having a small sp value, has a polar group containing, for example, a halogen atom, an oxygen atom or a nitrogen atom, an addition to carbon atoms and hydrogen atoms, and has an sp value in the range of 9.5 to 15.5 $(cal/cm^3)^{1/2}$.

As specific examples of the polar polymer, there can be mentioned polyvinyl chloride (sp value=9.7), polymethyl methacrylate (sp value=9.5), polyurethane (sp value=10.0), an epoxy resin (sp value=10.9), a phenolic resin (sp value=11.5), polyvinyl alcohol (sp value=12.6), nylon (sp value=13.6) and polyacrylonitrile (sp value=15.4).

For adhesion of the hydrocarbon polymer having an sp value of 7.8 to 8.5 $(cal/cm^3)1/2$ to the polar polymer having an sp value of 9.5 to 15.5 $(cal/cm^3)^{1/2}$, an adhesive composition comprising the modified cyclic structure-containing conjugated diene polymer (ii) as the main ingredient is suitable.

A substrate and an adherend are adhesively bonded either after they are separately shaped into shaped articles, or at a step of shaping them.

The hydrocarbon polymer and other polymers used as shaping materials for a substrate and an adherend can be shaped by any of, for example, a heat-melt shaping method, and a solution casting method. The heat-melt shaping method includes, for example, an extrusion shaping method, a press-forming method, an inflation shaping method, an injection molding method, a blow-molding method, a draw shaping method and a centrifugal forming method. To obtain a shaped article having high mechanical strength and high surface precision, an extrusion shaping method, a press-forming method and an injection molding method are preferable. In the case when a different material other than a polymer, such as, for example, metal or ceramics, is used as a shaping material for an substrate and an adherend, an appropriate shaping method can be adopted depending upon the shape of the shaped article. The shaping method may be a conventional method, which includes, for example, casting, dry-pressing, plastic forming, cutting and forging.

The shape of the shaped article includes, for example, a plate shape, a sheet form, cylindrical shape and square pillar shape. Preferably at least one of a substrate and an adherend is a sheet-form shaped article.

The hydrocarbon polymer used as shaping material for an substrate or an adherend can pre-treated to enhance the adhesive strength, if desired. The pre-treatment includes, for example, a plasma treatment.

The adhesion of a shaped article as substrate and a shaped article as adherend can be carried out by a conventional procedure wherein an adhesive composition comprising as the main ingredient the cyclic structure-containing conjugated diene polymer (i) or the modified cyclic structure-containing conjugated diene polymer (ii) (which adhesive composition is hereinafter abbreviated to as "adhesive composition" when appropriate) is applied on an adhesive surface of at least one of the shaped articles, and two adhesive surfaces of the shaped articles are contacted with each other, and bonded together by heating or other means whereby a shaped composite article is obtained. The shaped articles may have either similar shapes to each other or different shapes from each other.

More specifically the adhesion can be conducted by any of the following procedures. (1) a procedure wherein an adhesive composition (which may contain a solvent) is applied on an adhesive surface of at least one of the shaped article as substrate and the shaped article as adherend, and the adhesive surfaces of the shaped articles are contacted with each other, and the applied adhesive composition is solidified (if desired, further dried and cured) whereby the shaped articles are adhesively bonded; (2) a procedure wherein an adhesive composition (which may contain a solvent) is applied on an adhesive surface of at least one of the shaped article as substrate and the shaped article as adherend, and the layer of applied adhesive composition is semi-cured (the applied adhesive composition is not completely cured and is in a dry state, namely, a state of B-stage), and then the adhesive surfaces of the shaped articles are contacted with each other, and the applied adhesive composition is completely cured whereby the shaped articles are adhesively bonded; (3) a procedure wherein, when two shaped articles made of polymers are adhesively bonded, at least one of polymeric shaped articles and an adhesive composition are heat-melted, and the two polymeric shaped articles are melt-boded together (for example, by a co-extrusion method); and (4) an adhesive composition is shaped into a film, and the filmy adhesive is sandwiched between a shaped article as substrate and a shaped article as adherend, and the sandwich assembly is heated whereby the two shaped articles are bonded together.

The procedure for making the film of adhesive composition includes (i) a procedure wherein an adhesive composition (free from a solvent) is shaped into a film by a heat-melt shaping method such as melt extrusion, press-forming or inflation shaping, and (ii) a procedure wherein an adhesive composition containing a solvent is shaped into a film by a solution casting method. In the latter procedure (ii), a solution of an adhesive composition is applied onto a substrate having good releasability (for example, a polytetrafluoroethylene sheet), and the applied adhesive solution is heated to evaporate the solvent whereby a dry film is obtained.

The thickness of the film of adhesive composition can be appropriately chosen depending upon the particular shape of the shaped articles to be adhered, but the thickness is usually in the range of 0.5 μm to 1 mm. The melt adhesion of a sandwich assembly comprised of the shaped articles and the filmy adhesive composition can be carried out usually at a temperature in the range of 80 to 200° C., preferably 90 to 150° C. and more preferably 100 to 120° C. The melt adhesion can be carried out under pressure. The layer of adhesive composition in the melt adhered shaped articles can be cured, if desired.

II. Coating Material

The coating material of the present invention comprises a modified cyclic structure-containing conjugated diene polymer (ii'), that is a conjugated diene polymer having cyclic structures within the molecule which has a degree of cyclization in the range of 30 to 95%, and having added thereto 0.1 to 10% by weight of an anhydride of an α,β-ethylenically unsaturated dicarboxylic acid, and the ratio of {amount of (I)/[amount of (I)+amount of (II)]} is at least 60% by weight, wherein (I) is an acid anhydride group added and (II) is a dicarboxylic acid group formed by hydrolysis of an acid anhydride group (I).

By the term "coating material" as used in the present invention, we mean a material used for covering or coating at least part of a surface of a shaped article, which comprises the above-mentioned adhesive composition. After the coating material is applied onto a surface of a shaped article, the coating formed on the shaped article can be fabricated, if desired. The coating material is not particularly limited, but includes, for example, an adhesive, a primer, a coating liquid and an ink.

The modified cyclic structure-containing conjugated diene polymer (ii') constituting the coating material of the present invention includes (1) an addition product (ii'-1) obtained by allowing the cyclic structure-containing conjugated diene polymer (i) to react with an $\alpha,\beta$-ethylenically unsaturated carboxylic acid compound; and (2) a compound (ii'-2) obtained by first allowing a conjugated diene polymer to react with an $\alpha,\beta$-ethylenically unsaturated carboxylic acid compound, and then, cyclizing the thus-obtained addition reaction product. Of these, the former addition product (ii'-1) obtained by allowing the cyclic structure-containing conjugated diene polymer (i) to react with an $\alpha,\beta$-ethylenically unsaturated carboxylic acid compound is preferable. The polymer used as a raw material for the modified cyclic structure-containing conjugated diene polymer (ii'), and the production process and conditions adopted therefor are substantially the same as those which are adopted for the production of the above-mentioned modified cyclic structure-containing conjugated diene polymer (ii).

However, a conjugated diene polymer used as a raw material preferably has a weight average molecular weight in the range of 30,000 to 500,000, more preferably 50,000 to 300,000, as measured by gel permeation chromatography (GPC) and as expressed in terms of that of polystyrene. When the weight average molecular weight is too small, the resulting modified polymer (ii') tends to exhibit poor adhesion to a polyolefin resin. In contrast, when the weight average molecular weight is too large, a solution of the resulting modified polymer (ii') is liable to have a high viscosity and is difficult to form a uniform coating at a step of coating.

The modified cyclic structure-containing conjugated diene polymer (ii') has a degree of cyclization in the range of 30 to 95%, preferably 50 to 90% and more preferably 60 to 85%. The magnitude (n) of cyclic structure, namely, the number (n) of connected rings in a cyclic structure is not particularly limited, but n is usually in the range of 1 to 3.

In the modified cyclic structure-containing conjugated diene polymer (ii'), the amount of an anhydride of an $\alpha,\beta$-ethylenically unsaturated dicarboxylic acid added is in the range of 0.1 to 10% by weight, preferably 0.2 to 8% by weight and more preferably 0.3 to 5% by weight. The ratio of the amount of acid anhydride group (I) to the sum of the amount of (I) and the amount of dicarboxylic acid group (II) formed by hydrolysis of acid anhydride group (I) is at least 60% by weight, preferably at least 70% by weight and more preferably at least 80% by weight. The ratio of the amount of acid anhydride group (I) can be determined by the ratio of peak intensity of acid anhydride group and carboxylic acid group as measured by infrared spectrophotometry. As the ratio of (I) to the sum of (I) and (II) is larger provided that the amount of an anhydride of an $\alpha,\beta$-ethylenically unsaturated dicarboxylic acid added is within the above-specified range, the coating material exhibits a larger adhesion to a substrate to be adhered.

To obtain a modified cyclic structure-containing conjugated diene polymer (ii') having an increased amount of acid anhydride group (I), it is advisable to conduct operations in the absence of water during a step of the addition reaction or at a step of collecting a polymer after the addition reaction. When the dicarboxylic acid group formed by hydrolysis of an acid anhydride group is heated, it is dehydrated to be thereby converted to an acid anhydride group. Therefore, a modified cyclic structure-containing conjugated diene polymer (ii') having a small proportion of acid anhydride group (I) can be converted to a modified cyclic structure-containing conjugated diene polymer (ii') having an increased amount of acid anhydride group (I) by heating the former modified cyclic structure-containing conjugated diene polymer (ii'), for example, at a temperature of 160 to 180° C. for 30 minutes to 4 hours, preferably in an atmosphere of inert gas such as nitrogen or helium or under a reduced pressure.

The modified cyclic structure-containing conjugated diene polymer (ii') usually has a weight average molecular weight in the range of 5,000 to 600,000, preferably 22,000 to 370,000 and more preferably 37,000 to 230,000, as measured by GPC and as expressed in terms of that of polystyrene. This weight average molecular weight is similar to that of the above-mentioned modified cyclic structure-containing conjugated diene polymer (ii).

The modified cyclic structure-containing conjugated diene polymer (ii') may be used as a hydrogenation product, if desired. The procedure for hydrogenating the modified cyclic structure-containing conjugated diene polymer is not particularly limited and the hydrogenation can be carried out using a known hydrogenation catalyst and under a presence of hydrogen.

The coating material of the present invention includes, for example, an adhesive, a primer, a coating liquid or an ink, as mentioned above.

A primer is an under coating material used for pre-treating a surface of a shaped article prior to the coating the surface with other coating material such as general coating liquid or adhesive. The primer is a composition comprising a binder resin and optional additives, which are uniformly dissolved or dispersed in a liquid medium. The primer of the invention is a composition comprising the modified cyclic structure-containing conjugated diene polymer (ii') as at least part of the binder resin, and exhibits an improved adhesion to the shaped article surface and the coating material to be applied to the shaped article surface.

The content of the modified cyclic structure-containing conjugated diene polymer (ii') in the primer is not particularly limited but usually in the range of 5 to 95% by weight, preferably 10 to 90% by weight and more preferably 15 to 80% by weight. In the primer, binders other than the modified cyclic structure-containing conjugated diene polymer (ii'), such as, for example, an olefin resin, an acrylic resin, an urethane resin, an epoxy resin, a melamine resin, an alkyd resin, a chlorinated olefin resin, a silicone rubber and an acrylic rubber can be incorporated, if desired.

The primer of the present invention may have incorporated therein additives such as a pigment, a filler, an antioxidant, an ultraviolet absorber, a defoaming agent, a thickening agent, a dispersant and a surface active agent. The suitable amount thereof can be determined appropriately depending upon the particular kind of additive and object of addition.

The liquid medium used for the primer is not particularly limited provided that it is capable of dissolving or dispersing the modified cyclic structure-containing conjugated diene polymer (ii') and other optional binder resins. The liquid medium usually includes, aliphatic hydrocarbons, aromatic hydrocarbons, ketones, alcohols, ethers, halogen-containing compounds and aqueous mediums. Of these, aliphatic hydrocarbons, aromatic hydrocarbons, ketones and aqueous mediums are preferable in view of the volatility and the solubility of the modified cyclic structure-containing conjugated diene polymer (ii') and other optional binder resins.

The coating liquid and adhesive to be applied on to the surface of shaped article, which has been pre-treated with the primer, is not particularly limited. The coating liquid preferably includes, for example, an acrylic resin coating liquid, a polyester coating liquid, an alkyd-melamine resin coating liquid, a polyurethane coating liquid and a polyester-melamine resin coating liquid. The adhesive preferably includes, for example, an epoxy resin adhesive, an urethane adhesive, an acrylic resin adhesive and an instantaneous (rapidly curable) cyanoacrylate adhesive.

The coating liquid which is one kind of the coating material generally comprises a binder resin, a pigment, a liquid medium and optional additives. The binder resin has a function of fixing a pigment on a surface of a shaped article. In the case when the coating liquid contains the modified cyclic structure-containing conjugated diene polymer (ii') used in the present invention, a pigment can be firmly fixed to the shaped article surface. The content of the modified cyclic structure-containing conjugated diene polymer (ii') in the coating liquid is not particularly limited but usually in the range of 5 to 95% by weight, preferably 10 to 90% by weight and more preferably 15 to 80% by weight.

In the primer, binder resins other than the modified cyclic structure-containing conjugated diene polymer (ii'), such as, for example, an acrylic resin, an urethane resin, an epoxy resin, a melamine resin and an alkyd resin can be incorporated, if desired.

The pigment used for the coating liquid includes, a colorant such as organic coloring pigments and inorganic coloring pigments, and rust resisting pigments. The content of pigment in the coating liquid can be appropriately determined depending upon the kind of pigment and the depth of color. The liquid medium in the coating liquid is not particularly limited provided that it is capable of uniformly dissolving or dispersing the modified cyclic structure-containing conjugated diene polymer (ii'), optional binder resins, pigments and optional additives. The liquid medium includes, for example, those which are recited for the primer. The additives optionally used for the coating liquid includes, for example, a thixotropic agent, an antioxidant, an ultraviolet absorber, a defoaming agent, a thickening agent, a dispersant and a surface active agent.

The shaped article to which the above-mentioned coating material is applied is not particularly limited, but, the coating material is advantageously applied to polyolefin resin shaped articles. As specific examples of the polyolefin resin, there can be mentioned polypropylene resins such as a propylene homopolymer, a propylene-ethylene copolymer, a propylene-butene copolymer and a propylene-octene copolymer; an ethylene homopolymer; norbornene polymers and hydrogenation products thereof; and cyclic conjugated diene polymers and hydrogenation products thereof.

The primer which is one kind of the coating material of the present invention has a function of greatly improving the adhesion between resin shaped articles, especially polyolefin shaped articles, and a coating liquid or an adhesive. Therefore, the primer is beneficially used as surface modifiers which are applied to electrical and electronic parts, automobile parts and other parts; packaging materials; vessels for beverage and cosmetics; materials for sport goods such as sport shoes and golf balls; and construction materials such as gaskets and sealing materials. The primer is especially suitable for surface modification of automobile exterior parts such as a bumper, a mat-guard, a weather-strip and a glass-run-channel, and automobile interior parts such as an instrument panel, a grommet and an air-bag.

The invention will now be described specifically by the following working examples that by no means limit the scope of the invention. Parts and % in the working examples are by weight unless otherwise specified.

Properties of polymers and adhesive strength of shaped composite articles were evaluated by the following methods.
(1) Weight Average Molecular Weight of Polymer The weight average molecular weight of a polymer was measured by gel permeation chromatography (GPC) and expressed in terms of that of standard polystyrene.
(2) Degree of Cyclization of Cyclic Structure-Containing Conjugated Diene Polymer Proton peak areas attributed to the double bonds in a conjugated diene polymer are measured before and after the cyclization reaction. The degree of cyclization is calculated according to the following equation.

$$\text{Degree of cyclization (\%)}=100-X$$

wherein $X$ is a ratio in percent of the peak area attributed to the double bonds as measured after the cyclization reaction, provided that the peak area attributed to the double bonds as measured before the cyclization reaction is 100.
(3) Amount of Maleic Anhydride Added and Ratio of Acid Anhydride Group The amount of maleic anhydride added in a cyclic structure-containing conjugated diene polymer is determined as follows. The acid value of the maleic anhydride-added cyclic structure-containing conjugated diene polymer is measured by the method described in Standard Oil and Fat Analyzing Method (Japan Oil Chemists' Society) 2.4.1-83, immediately after the addition of maleic anhydride. However, in the case when the acid value of the maleic anhydride-added cyclic structure-containing conjugated diene polymer is measured by this method, it is provided that the mol number of potassium hydroxide consumed for neutralization of maleic anhydride added is the same as the mol number of maleic acid added. Therefore, the amount of maleic anhydride in the maleic anhydride-added cyclic structure-containing conjugated diene polymer is calculated according to the above-mentioned equation for the determination of an α,β-ethylenically unsaturated carboxylic acid compound added, provided that "n" in the equation is 1.

The ratio in % of an acid anhydride group to the sum of an acid anhydride group and a dicarboxylic acid group is determined from the content of an acid anhydride group and the content of a dicarboxylic acid group. The content of an acid anhydride group and the content of a dicarboxylic acid group are calculated from the calibrations curves as obtained by measurement of the peak density attributed to an acid anhydride group at 1760 to 1780 $cm^{-1}$ and the peak density attributed to a dicarboxylic acid group at 1700 $cm^{-1}$, respectively, by Fourier transform infrared spectroscopy.
(4) Acid Value and Hydroxyl Value of Polyester Acid value of a polyester is determined by the method stipulated in Standard Oil and Fat Analyzing Method (Japan Oil Chemists' Society) 2.4.1-83. Hydroxyl value of a polyester is determined by the method stipulated in Standard Oil and Fat Analyzing Method (Japan Oil Chemists' Society) 2.4.9.2-83.

(5) Adhesive Strength (Tensile Shear Strength)

In the case when a polymer is used as a substrate and/or an adherend, a test sample (plate-shaped sample) is prepared by an injection molding method according to JIS K-6850. A laminate of two plate-shaped samples and an adhesive composition sandwiched between the samples so that the adhesive surfaces of the samples confront each other, is made. The laminate is heated whereby the plate-shaped samples are adhered together. Then the tensile shear strength of the laminate is measured according to JIS K-6854.

(6) Lattice Pattern Cutting Test (Initial Adhesion Test)

A plate-shaped sample is coated with a coating material, and the coated surface is notched using a cutting knife with parallel eleven lines with 2 mm distances and perpendicular parallel eleven lines with 2 mm distances so that each notching line cuts the coating and reaches the plate-shaped sample whereby a lattice pattern composed of 100 squares is formed on the coated surface. A self-adhesive tape is adhered on the notched coated surface, and one end of the tape is pinched by fingers and the tape is peeled at an angle of 45 degree. Initial adhesion of the coating is evaluated by the number of squares remaining without separation from the plate per 100 squares.

(7) Water Resistant Adhesion Test

A plate-shaped sample is coated with a coating material, and the coated sample is immersed in warm water at 40° C. for 240 hours. Thereafter the above-mentioned lattice pattern cutting test is conducted on the coated sample to count the number of squares remaining without separation from the plate per 100 squares.

(8) Accelerated Weathering Test

Accelerated weathering test is carried out using a carbon arc sun-shine weatherometer for a stated time. Mirror reflection (%) of the exposed surface is measured according to JIS K5400, 7.6, at an incident of 60 degree from the light source.

(9) Flowability of Primer and Coating Liquid

Flow down time at 20° C. is measured according to the Ford cup No. 4 method stipulated in JIS K5400.

REFERENCE EXAMPLE 1

Preparation of Modified Cyclic Structure-containing Polymer A

A four-necked flask equipped with a stirrer, a thermometer, a reflux cooling condenser and a nitrogen gas-introducing tube was charged with 100 parts of polyisoprene (cis-1,4-structure isoprene units: 86%, trans-1,4-structure isoprene units: 12%, 3,4-structure isoprene units: 2%, weight average molecular weight: 136,000) and 1,570 parts of toluene. The inner atmosphere of the flask was substituted with nitrogen gas, and the flask was heated to 85° C. in an oil bath while the content was stirred, whereby polyisoprene was completely dissolved in toluene. Then 3.9 parts of p-toluenesulfonic acid was added and the mixture was stirred while being maintained at 85° C., to conduct a cyclization reaction. When 5 hours elapsed, 400 parts of ion-exchanged water was added to stop the cyclization reaction. The reaction mixture was allowed to stand for 30 minutes and a separated oil layer was taken. The oil layer was washed with 400 parts of ion-exchanged water three times, and then subjected to centrifugal separation at a revolution of 300 rpm to remove moisture. Further, the oil layer was heated at 130° C. to completely remove moisture.

While the thus-obtained solution of cyclic structure-containing polyisoprene in toluene was stirred, 2.5 parts of maleic anhydride was continuously added at a constant rate to the solution over a period of 5 minutes. The mixture was maintained at 160° C. for 4 hours to conduct a maleic anhydride-addition reaction. The liquid reaction mixture was poured into 3,000 parts of a solution containing 1% of 2,6-di-tert-butylphenol in acetone to deposit the cyclic structure-containing polymer. The deposited polymer was collected and dried under a reduced pressure to give a maleic anhydride-modified cyclic structure-containing polymer A. Degree of cyclization of the cyclic structure-containing polymer, weight average molecular weight of the modified cyclic structure-containing polymer A, and the amount of maleic anhydride added are shown in Table 1.

REFERENCE EXAMPLE 2

Preparation of Modified Cyclic Structure-containing Polymer B

The procedures described in Reference Example 1 were repeated to obtain a maleic anhydride-modified cyclic structure-containing polymer B wherein polyisoprene (cis-1,4-structure isoprene units: 73%, trans-1,4-structure isoprene units: 22%, 3,4-structure isoprene units: 5%, weight average molecular weight: 107,000) was used and the amount of p-toluenesulfonic acid was changed to 3.6 parts for the cyclization reaction, and the amount of maleic anhydride was changed to 2 parts for the maleic anhydride-addition reaction. All other conditions remained the same. Degree of cyclization of the cyclic structure-containing polymer, weight average molecular weight of the modified cyclic structure-containing polymer B, and the amount of maleic anhydride added are shown in Table 1.

REFERENCE EXAMPLE 3

Preparation of Modified Cyclic Structure-containing Polymer C

The procedures described in Reference Example 1 were repeated to obtain a maleic anhydride-modified cyclic structure-containing polymer C wherein polyisoprene (cis-1,4-structure isoprene units: 30%, trans-1,4-structure isoprene units: 14%, 3,4-structure isoprene units: 56%, weight average molecular weight: 252,000) was used and the amount of p-toluenesulfonic acid was changed to 3 parts for the cyclization reaction, and the amount of maleic anhydride was changed to 2.8 parts for the maleic anhydride-addition reaction. All other conditions remained the same. Degree of cyclization of the cyclic structure-containing polymer, weight average molecular weight of the modified cyclic structure-containing polymer C, and the amount of maleic anhydride added are shown in Table 1.

REFERENCE EXAMPLE 4

Preparation of Modified Cyclic Structure-containing Polymer D

A four-necked flask equipped with a stirrer, a thermometer, a reflux cooling condenser and a nitrogen gas-introducing tube was charged with 100 parts of polyisoprene (cis-1,4-structure isoprene units: 73%, trans-1,4-structure isoprene units: 22%, 3,4-structure isoprene units: 5%, weight average molecular weight: 107,000, cut to a size of 10 mm square) and 1,570 parts of toluene. The inner atmosphere of the flask was substituted with nitrogen gas, and the flask was heated to 80° C. in an oil bath while the content was stirred, whereby polyisoprene was dissolved in toluene. After polyisoprene was completely dissolved, 7.2 parts of maleic anhydride was added, and the mixture was maintained at 180° C. for one hour to conduct a maleic anhydride-addition reaction. The liquid reaction mixture was poured into 3,000 parts of a solution containing 1% of 2,6-di-tert-butylphenol in acetone to deposit the maleic acid-modified polymer. The deposited polymer was collected and dried under a reduced pressure to give a maleic anhydride-modified isoprene polymer.

100 parts of the maleic anhydride-modified isoprene polymer was re-dissolved in 300 parts of toluene, and 3.2 parts of p-toluenesulfonic acid was added, and the mixture was stirred while being maintained at 85° C., to conduct a cyclization reaction. When about 5 hours elapsed, 400 parts of ion-exchanged water was added to stop the cyclization reaction. The reaction mixture was allowed to stand for 30 minutes and a separated oil layer was taken. The oil layer was washed with 400 parts of ion-exchanged water three times, and then was poured into 1,000 parts of a solution containing 1% of 2,6-di-tert-butylphenol in methanol to deposit the maleic acid-modified polymer. The deposited polymer was collected and dried under a reduced pressure to give a maleic anhydride-modified isoprene polymer D. Degree of cyclization and weight average molecular weight of the modified cyclic structure-containing polymer, and the amount of maleic anhydride added are shown in Table 1.

COMPARATIVE REFERENCE EXAMPLE 1

Preparation of Modified Cyclic Structure-containing Polymer E

The procedures described in Reference Example 1 were repeated to obtain a maleic anhydride-modified cyclic structure-containing polymer E wherein 1.9 parts of p-toluenesulfonic acid was used instead of 3.9 parts for the cyclization reaction, and the amount of maleic anhydride was changed to 2.0 parts for the maleic anhydride-addition reaction. All other conditions remained the same. Degree of cyclization of the cyclic structure-containing polymer, weight average molecular weight of the modified cyclic structure-containing polymer E, and the amount of maleic anhydride added are shown in Table 1.

EXAMPLES 1-11, COMPARATIVE EXAMPLES 1-3

Production and Evaluation of Shaped Composite Article

Each of the maleic anhydride-modified cyclic structure-containing polymers A through E, prepared in Reference Examples 1 to 4 and Comparative Reference Example 1, was completely dissolved in toluene to prepare a polymer solution of 20% concentration in toluene. The polymer solution was allowed to stand for 24 hours.

A plate specimen of a different material shown in Table 3, below, was prepared. An adhesive surface of the plate specimen was coated with the above-mentioned solution of the modified cyclic structure-containing polymer, and the liquid polymer coating was dried at 80° C. A plate specimen of a hydrocarbon polymer, shown in Table 2, below, was superposed on the dried polymer coating of the plate specimen of different material to prepare a laminate. The laminate was held between glass pieces and fixed by clips. The laminate was maintained at 100° C. for 15 minutes in an oven to melt the modified cyclic structure-containing polymer whereby the plate specimen of hydrocarbon polymer and the plate specimen of different material were adhesively bonded together. Tensile shear strength of the laminate was measured. The result is shown in Table 4, below.

Combinations of a hydrocarbon polymer plate and a different material plate, and a maleic anhydride-modified polymer are shown in Table 4, below.

TABLE 2

Crystalline hydrocarbon polymer:

① Polypropylene resin ("J-3054HP" available from Idemitsu Pet. Chem., sp value: 8.2)
② Polyethylene resin ("J300" available from Asahi Kasei, sp value: 7.9)

Non-crystalline hydrocarbon polymer:

③ Hydrogenation product of polymer made by ring opening polymerization (ethyltetracyclododecene units: 15%, dicylopentadiene units: 85%) Tg: 103° C., Degree of hydrogenation: more than 99%, sp value: 8.5
④ Ethylene-octene copolymer ("Engage 8100" available from Du Pont-Dow Elastomer Co., MFI (ASTM D-1238): 1.0 dg/min, sp value: 8.3

TABLE 1

|  | Reference Example | | | | Co. R. Ex. |
| --- | --- | --- | --- | --- | --- |
|  | 1 | 2 | 3 | 4 | 1 |
| Cyclization degree of Cyclized conjugated diene polymer (%) | 83 | 78 | 68 | 73 | 26 |
| Amount of maleic Anhydride added (%) | 1.8 | 1.3 | 1.5 | 3.9 | 1.6 |
| Weight average molecular weight (Mv) | 103,400 | 73,000 | 215,000 | 88,900 | 121,000 |
| Modified polymer | A | B | C | D | E |

TABLE 3

| Shaped plate | Material for shaped plate |
|---|---|
| ⑤ | Stainless steel SUS 430 W, available from Nippon Metal K.K., cut from band steel |
| ⑥ | Glass plate, slide glass, commercially available |
| ⑦ | Wood, Japanese cypress, cut from square timber for doorsill |
| ⑧ | Cotton non-woven fabric, stitch-bond, available from Nippon Woven Fabric K/K. |

TABLE 4

| | Example | | | | | | | | | | | Comparative Example | | |
|---|---|---|---|---|---|---|---|---|---|---|---|---|---|---|
| | 1 | 2 | 3 | 4 | 5 | 6 | 7 | 8 | 9 | 10 | 11 | 1 | 2 | 3 |
| Modified polymer | A | B | C | D | A | B | A | B | A | A | D | E | E | E |
| Hydrocarbon polymer | ① | ① | ① | ① | ① | ① | ② | ② | ③ | ④ | ④ | ① | ② | ④ |
| Different material | ⑤ | ⑤ | ⑤ | ⑤ | ⑥ | ⑦ | ⑦ | ⑧ | ⑧ | ⑥ | ⑥ | ⑤ | ⑦ | ⑥ |
| Tensile shear strength | 316 | 289 | 345 | 275 | 395 | 306 | 246 | 225 | 384 | 375 | 295 | 16 | 8 | 12 |

Units of tensile shear strength: N/cm²

EXAMPLES 12-22, COMPARATIVE EXAMPLES 4-6

Production and Evaluation of Shaped Composite Article

Each of the maleic anhydride-modified cyclic structure-containing polymers A through E, prepared in Reference Examples 1 to 4 and Comparative Reference Example 1, was dissolved in toluene to prepare a polymer solution of 20% concentration in toluene. The polymer solution was coated on a polytetrafluoroethylene sheet so that a coating having a thickness of 50 μm (as dried film thickness) was formed. The liquid coating was allowed to stand to gradually evaporate toluene to form a dry film. The film was separated.

The film was sandwiched between an adhesive surface of a plate specimen of a different material shown in Table 3 and an adhesive surface of a plate specimen of a hydrocarbon polymer shown in Table 2, to prepare a laminate. The laminate was held between glass pieces and fixed by clips. The laminate was maintained at 100° C. for 15 minutes in an oven to melt the film of modified polymer whereby the plate specimen of hydrocarbon polymer and the plate specimen of different material were adhesively bonded together. Tensile shear strength of the laminate was measured. The result is shown in Table 5, below.

Combinations of a hydrocarbon polymer plate and a different material plate, and a maleic anhydride-modified polymer are shown in Table 5, below.

TABLE 5

| | Example | | | | | | | | | | | Comparative Example | | |
|---|---|---|---|---|---|---|---|---|---|---|---|---|---|---|
| | 12 | 13 | 14 | 15 | 16 | 17 | 18 | 19 | 20 | 21 | 22 | 4 | 5 | 6 |
| Modified polymer | A | B | C | D | A | B | A | B | A | A | D | E | E | E |
| Hydrocarbon polymer | ① | ① | ① | ① | ① | ① | ② | ② | ③ | ④ | ④ | ① | ② | ④ |
| Different material | ⑤ | ⑤ | ⑤ | ⑤ | ⑥ | ⑦ | ⑦ | ⑧ | ⑧ | ⑥ | ⑥ | ⑤ | ⑦ | ⑥ |
| Tensile shear strength | 308 | 256 | 312 | 241 | 358 | 249 | 221 | 196 | 345 | 365 | 264 | 14 | 7 | 10 |

Units of tensile shear strength: N/cm²

Comparative Reference Example 2

Polymer F

Polyisoprene (cis-1,4-structure isoprene units: 86%, trans-1,4-structure isoprene units: 12%, 3,4-structure isoprene units: 2%, weight average molecular weight: 136,000) used in Reference Example 1 is referred to as polymer F.

Properties of polymer F are shown in Table 6, below. For comparison, properties of the maleic anhydride-modified polymers A through D, prepared in Reference Examples 1 to 4, are also shown in Table 6, below.

TABLE 6

|  | Reference Example | | | | Co. Re. Ex. |
|---|---|---|---|---|---|
|  | 1 | 2 | 3 | 4 | 1 |
| Modified polymer | A | B | C | D | F |
| Weight average molecular weight (Mv) | 103,400 | 73,000 | 215,000 | 88,900 | 136,000 |
| Cyclization degree of Cyclized conjugated diene polymer (%) | 83 | 78 | 68 | 73 | — |
| Amount of maleic Anhydride added (%) | 1.8 | 1.3 | 1.5 | 3.9 | — |

EXAMPLES 23-39, COMPARATIVE EXAMPLES 7, 8

Production and Evaluation of Shaped Composite Article

Each of the maleic anhydride-modified cyclic structure-containing polymers A through D, and polymer F was completely dissolved in toluene to prepare a polymer solution of 20% concentration in toluene. The polymer solution was allowed to stand for 24 hours.

TABLE 7

| Shaped plate | Material for shaped plate |
|---|---|
| ⑨ | Polymethacrylate resin, "Acrylite EX" available from Mitsubishi Rayon Co., sp value: 9.5 |
| ⑩ | Fiber Reinforced Plastic "Glasslite G-31" available from Nittobo Co., sp value: 11.0 |
| ⑪ | Nylon 66 "Amilan 3006B" available from Toray Ind. Ltd., sp value: 13.5 |
| ⑫ | Polyvinyl chloride, "HS-65" available from Nippon Plas Ind. Co., sp value: 9.7 |

TABLE 8

|  | Example | | | | | | | | | |
|---|---|---|---|---|---|---|---|---|---|---|
|  | 23 | 24 | 25 | 26 | 27 | 28 | 29 | 30 | 31 | 32 |
| Modified cyclic polymer | A | B | C | D | A | B | A | B | A | B |
| Hydrocarbon polymer | ① | ① | ① | ① | ① | ① | ① | ① | ② | ② |
| Polar polymer | ⑨ | ⑨ | ⑨ | ⑨ | ⑩ | ⑩ | ⑪ | ⑪ | ⑩ | ⑩ |
| Tensile shear strength | 126 | 135 | 85 | 78 | 118 | 128 | 135 | 140 | 108 | 110 |

|  | Example | | | | | | | Comp. Ex. | |
|---|---|---|---|---|---|---|---|---|---|
|  | 33 | 34 | 35 | 36 | 37 | 38 | 39 | 7 | 8 |
| Modified cyclic polymer | A | B | A | B | A | B | D | F | F |
| Hydrocarbon polymer | ② | ② | ③ | ③ | ④ | ④ | ④ | ① | ② |
| Polar polymer | ⑪ | ⑪ | ⑩ | ⑩ | ⑫ | ⑫ | ⑫ | ⑨ | ⑩ |
| Tensile shear strength | 98 | 105 | 154 | 159 | 168 | 165 | 135 | 1> | 1> |

Units of tensile shear strength: N/cm$^2$

A plate specimen of a polar polymer shown in Table 7, below, was prepared. An adhesive surface of the plate specimen was coated with the above-mentioned solution of the modified cyclic structure-containing polymer, and the liquid polymer coating was dried at 80° C. A plate specimen of a hydrocarbon polymer, shown in Table 2, was made by injection molding according to JIS K6850. The injection molded hydrocarbon polymer plate specimen was superposed on the coating of modified polymer formed on the polar polymer plate. The assembly of the coated polar polymer plate and the hydrocarbon polymer plate was held between glass pieces and fixed by clips. The assembly was maintained at 100° C. for 5 minutes in an oven to melt the modified cyclic structure-containing polymer film whereby the hydrocarbon polymer plate and the polar polymer plate were adhesively bonded together. Tensile shear strength of the laminate was measured. The result is shown in Table 8, below.

EXAMPLES 40-56, COMPARATIVE EXAMPLES 9, 10

Production and Evaluation of Shaped Composite Article

Each of the maleic anhydride-modified cyclic structure-containing polymers A through D, prepared in Reference Examples 1 to 4 and polymer F, prepared in Comparative Reference Example 2, was dissolved in toluene to prepare a polymer solution of 20% concentration in toluene in a manner similar to those in Examples 23-39 and Comparative Examples 7 and 8. The polymer solution was coated on a polytetrafluoroethylene (PTFE) sheet so that a coating having a thickness of 50 μm (as dried film thickness) was formed. The liquid coating was allowed to stand to gradually evaporate toluene to form a dry film. The film was separated.

The film was sandwiched between an adhesive surface of a plate specimen of a polar polymer and an adhesive surface of a plate specimen of a hydrocarbon polymer, to prepare a laminate, according to the formulation shown in Table 9. The laminate was held between glass pieces and fixed by clips. The laminate was maintained at 100° C. for 15 minutes in an oven to melt the film of modified polymer whereby the plate specimen of hydrocarbon polymer and the plate specimen of polar polymer were adhesively bonded together. Tensile shear strength of the laminate was measured. The result is shown in Table 9, below.

Combinations of a hydrocarbon polymer plate and a polar polymer plate, and a maleic anhydride-modified polymer are shown in Table 9, below.

REFERENCE EXAMPLE 6

Preparation of Cyclic Structure-Containing Polymer I

The procedures described in Reference Example 5 were repeated to obtain a cyclic structure-containing polymer I wherein polyisoprene (cis-1,4-structure isoprene units: 73%, trans-1,4-structure isoprene units: 22%, 3,4-structure isoprene units: 5%, weight average molecular weight: 107,000) was used and the amount of p-toluenesulfonic acid was changed to 3.6 parts for the cyclization reaction. All other

TABLE 9

| | Example | | | | | | | | | |
|---|---|---|---|---|---|---|---|---|---|---|
| | 40 | 41 | 42 | 43 | 44 | 45 | 46 | 47 | 48 | 49 |
| Modified cyclic polymer | A | B | C | D | A | B | A | B | A | B |
| Hydrocarbon polymer | ① | ① | ① | ① | ① | ① | ① | ① | ② | ② |
| Polar polymer | ⑨ | ⑨ | ⑨ | ⑨ | ⑩ | ⑩ | ⑩ | ⑩ | ⑩ | ⑩ |
| Tensile shear strength | 108 | 115 | 65 | 53 | 98 | 103 | 113 | 124 | 89 | 96 |

| | Example | | | | | | | Comp. Ex. | |
|---|---|---|---|---|---|---|---|---|---|
| | 50 | 51 | 52 | 53 | 54 | 55 | 56 | 9 | 10 |
| Modified cyclic polymer | A | B | A | B | A | B | D | F | F |
| Hydrocarbon polymer | ② | ② | ③ | ③ | ④ | ④ | ④ | ① | ② |
| Polar polymer | ⑪ | ⑪ | ⑫ | ⑫ | ⑬ | ⑬ | ⑬ | ⑨ | ⑩ |
| Tensile shear strength | 88 | 92 | 152 | 146 | 162 | 159 | 149 | 1> | 1> |

REFERENCE EXAMPLE 5

Preparation of Cyclic Structure-Containing Polymer H

A four-necked flask equipped with a stirrer, a thermometer, a reflux cooling condenser and a nitrogen gas-introducing tube was charged with 100 parts of polyisoprene (cis-1,4-structure isoprene units: 86%, trans-1,4-structure isoprene units: 12%, 3,4-structure isoprene units: 2%, weight average molecular weight: 136,000, cut to a size of 10 mm×10 mm) and 1,570 parts of toluene. The inner atmosphere of the flask was substituted with nitrogen gas, and the flask was heated to 85° C. in an oil bath while the content was stirred, whereby polyisoprene was completely dissolved in toluene. Then 3.9 parts of p-toluenesulfonic acid was added and the mixture was stirred while being maintained at 85° C., to conduct a cyclization reaction. When about 5 hours elapsed, 400 parts of ion-exchanged water was added to stop the cyclization reaction. The reaction mixture was allowed to stand for 30 minutes and a separated oil layer was taken. The oil layer was washed with 400 parts of ion-exchanged water three times, and then subjected to centrifugal separation at a revolution of 300 rpm to remove moisture. Further, the oil layer was heated at 130° C. to completely remove moisture.

The obtained liquid was poured into 3,000 parts of a solution containing 1% of 2,6-di-tert-butylphenol in methanol to deposit the cyclic structure-containing polymer. The deposited polymer was collected and dried under a reduced pressure to give a cyclic structure-containing polymer H. Weight average molecular weight and degree of cyclization of the cyclic structure-containing polymer H are shown in Table 10, below.

conditions remained the same. Weight average molecular weight and degree of cyclization of the cyclic structure-containing polymer I are shown in Table 10, below.

REFERENCE EXAMPLE 7

Preparation of Cyclic Structure-containing Polymer J

The procedures described in Reference Example 5 were repeated to obtain a cyclic structure-containing polymer J wherein polyisoprene (cis-1,4-structure isoprene units: 30%, trans-1,4-structure isoprene units: 14%, 3,4-structure isoprene units: 56%, weight average molecular weight: 252,000) was used and the amount of p-toluenesulfonic acid was changed to 3 parts for the cyclization reaction. All other conditions remained the same. Weight average molecular weight and degree of cyclization of the cyclic structure-containing polymer J are shown in Table 10, below.

REFERENCE EXAMPLE 8

Preparation of Cyclic Structure-containing Polymer K

The procedures described in Reference Example 5 were repeated to obtain a cyclic structure-containing polymer K wherein polybutadiene (cis-1,4-structure butadiene units: 26%, trans-1,4-structure butadiene units: 18%, 1,2-structure butadiene units: 56%, weight average molecular weight: 210,000) was used instead of polyisoprene and the amount of tolune was changed to 1,620 parts. Further, a solution of polybutadiene in toluene was maintained at 23° C. and then, 2.78 parts of benzyl chloride and 1.8 parts of ethylaluminum dichloride were added instead of p-toluenesulfonic acid, and, when 12 minutes elapsed from the addition of benzyl chloride and ethylaluminum dichloride, 20 parts of methanol was added to stop the cyclization reaction. All other conditions remained the same. Weight average molecular weight and degree of cyclization of the cyclic structure-containing polymer K are shown in Table 10, below.

crystalline polymer were adhesively bonded together. Tensile shear strength of the laminate was measured. The result is shown in Table 11, below.

Combinations of a crystalline hydrocarbon polymer plate and a non-crystalline hydrocarbon polymer plate, and a cyclic structure-containing polymer or chlorinated polypropylene are shown in Table 11, below.

TABLE 11

|  | Example | | | | | | | | | | Com. Ex. | |
| --- | --- | --- | --- | --- | --- | --- | --- | --- | --- | --- | --- | --- |
|  | 57 | 58 | 59 | 60 | 61 | 62 | 63 | 64 | 65 | 66 | 11 | 12 |
| Cycl. polymer | H | I | J | K | H | I | H | I | H | H | Cl-PP | |
| Crystal. HC Polymer | ① | ① | ① | ① | ① | ① | ② | ② | ② | ② | ① | ② |
| Non-crystal. HC polymer | ③ | ③ | ③ | ③ | ④ | ④ | ③ | ③ | ④ | ④ | ③ | ④ |
| Tensile shear strength | 215 | 189 | 205 | 156 | 195 | 158 | 226 | 215 | 209 | 231 | 19 | 56 |

Cycl. Polymer: Cyclized polymer
Crystl. HC polymer: Crystalline hydrocarbon polymer
Non-crystl. HC polymer: Non-crystalline hydrocarbon polymer
Cl-PP: Chlorinated polypropylene
Units of tensile shear strength: N/cm$^2$

TABLE 10

|  | Reference Example | | | |
| --- | --- | --- | --- | --- |
|  | 5 | 6 | 7 | 8 |
| Cyclization degree of Cyclized conjugated diene polymer (%) | 83 | 78 | 68 | 73 |
| Weight average molecular weight (Mv) | 103,400 | 73,000 | 215,000 | 88,900 |
| Modified polymer | H | I | J | K |

EXAMPLES 57-66, COMPARATIVE EXAMPLES 11, 12

Production and Evaluation of Shaped Composite Article

Each of the cyclic structure-containing polymers H through K, prepared in Reference Examples 5 to 8 was completely dissolved in toluene to prepare a polymer solution of 20% concentration in toluene. The polymer solution was allowed to stand for 24 hours.

In Comparative Examples 11 and 12, instead of the solution of cyclic structure-containing polymer, a 32% solution of chlorinated polypropylene ("Superchlon 773H" available from Nippon Paper Ind. Ltd.) was used.

An adhesive surface of a plate of crystalline hydrocarbon polymer ① or ② shown in Table 2 was coated with the above-mentioned polymer solution, and the liquid polymer coating was dried at 80° C. A plate of a non-crystalline hydrocarbon polymer ③ or ④, shown in Table 2, was superposed on the dried polymer coating of the crystalline hydrocarbon polymer plate to prepare a laminate. The laminate was held between glass pieces and fixed by clips. The laminate was maintained at 100° C. for 15 minutes in an oven to melt the polymer coating whereby the plate of crystalline hydrocarbon polymer and the plate of non-

EXAMPLES 67-76, COMPARATIVE EXAMPLE 13

Production and Evaluation of Shaped Composite Article

Each of the cyclic structure-containing polymers H through K, prepared in Reference Examples 5 to 8, was dissolved in toluene to prepare a 20% polymer solution in toluene in a manner similar to those in Examples 17-66.

In Comparative Example 13, instead of the cyclic structure-containing polymer solution, a 32% solution of chlorinated polypropylene ("Superchlon 773H" available from Nippon Paper Ind. Ltd.) was used.

Each polymer solution was coated on a polytetrafluoroethylene sheet so that a coating having a thickness of 50 μm (as dried film thickness) was formed. The liquid coating was allowed to stand to gradually evaporate toluene or other solvent to form a dry polymer film. The polymer film was separated.

The polymer film was sandwiched between an adhesive surface of a plate of crystalline hydrocarbon polymer ① or ② shown in Table 2 and an adhesive surface of a plate of a non-crystalline hydrocarbon polymer ③ or ④, shown in Table 2, to prepare a laminate. The laminate was held between glass pieces and fixed by clips. The laminate was maintained at 100° C. for 15 minutes in an oven to melt the polymer film whereby the crystalline polymer plate and the non-crystalline polymer plate were adhesively bonded together. Tensile shear strength of the laminate was measured. The result is shown in Table 12, below.

Combinations of a crystalline polymer plate and a non-crystalline polymer plate, and a cyclized polymer or chlorinated polypropylene are shown in Table 12, below.

As seen from Tables 11 and 12, in the case when a crystalline hydrocarbon polymer and a non-crystalline hydrocarbon polymer are adhesively bonded together using chlorinated polypropylene as an adhesive, the tensile strength, i.e., tensile shear strength, is very low. With regard to various combinations of the crystalline hydrocarbon polymers and the non-crystalline polymers, shown in Table 11, and combinations of crystalline hydrocarbon polymers and non-crystalline polymers, which are not recited in Table 11, adhesion tests were carried out by the same procedures as mentioned above using chlorinated polypropylene as an adhesive, relatively good tensile shear strengths could be obtained only for very limited combinations of crystalline hydrocarbon polymers and non-crystalline polymers. Therefore, chlorinated polypropylene cannot be widely used as an adhesive.

In contrast, in the case when an adhesive composition comprising a cyclic structure-containing conjugated diene polymer as the main ingredient, the tensile strength, i.e., tensile shear strength, is very large, and the adhesive composition can be widely applied for various combinations of hydrocarbon polymers.

COMPARATIVE REFERENCE EXAMPLE 3

Preparation of Modified Cyclic Structure-containing Polymer M

In this comparative reference example 3, a modified cyclic structure-containing polymer was prepared with reference to the method as taught in JP-A S57-145103.

A four-necked flask equipped with a stirrer, a thermometer, a reflux cooling condenser and a nitrogen gas-introducing tube was charged with 100 parts of polyisoprene (cis-1,4-structure isoprene units: 73%, trans-1,4-structure isoprene units: 22%, 3,4-structure isoprene units: 5%, weight average molecular weight: 107,000, cut to a size of 10 mm×10 mm square) and 1,570 parts of toluene. The inner atmosphere of the flask was substituted with nitrogen gas, and the flask was heated to 80° C. in an oil bath while the

TABLE 12

|  | Example |  |  |  |  |  |  |  |  |  | Co. Ex. |
|---|---|---|---|---|---|---|---|---|---|---|---|
|  | 67 | 68 | 69 | 70 | 71 | 72 | 73 | 74 | 75 | 76 | 13 |
| Cycl. polymer | H | I | J | K | H | I | H | I | H | H | Cl-PP |
| Crystal. HC Polymer | ① | ① | ① | ① | ① | ① | ② | ② | ② | ② | ① |
| Non-crystal. HC polymer | ③ | ③ | ③ | ③ | ④ | ④ | ③ | ③ | ④ | ④ | ③ |
| Tensile shear strength | 206 | 178 | 189 | 136 | 198 | 160 | 218 | 204 | 201 | 216 | 32 |

Cycl. Polymer: Cyclized polymer
Crystl. HC polymer: Crystalline hydrocarbon polymer
Non-crystl. HC polymer: Non-crystalline hydrocarbon polymer
Cl-PP: Chlorinated polypropylene
Units of tensile shear strength: N/cm$^2$

REFERENCE EXAMPLE 9

Preparation of Modified Cyclic Structure-containing Polymer L

The procedures described in Reference Example 1 (preparation of modified cyclic structure-containing polymer A) were repeated to obtain a modified cyclic structure-containing polymer L wherein polybutadiene (cis-1,4-structure butadiene units: 26%, trans-1,4-structure butadiene units: 18%, 1,2-structure butadiene units: 56%, weight average molecular weight: 210,000) was used instead of polyisoprene and the amount of tolune was changed to 1,620 parts. Further, a solution of polybutadiene in toluene was maintained at 23° C. and then, 2.78 parts of benzyl chloride and 1.8 parts of ethylaluminum dichloride were added instead of p-toluenesulfonic acid, and, when 12 minutes elapsed from the addition of benzyl chloride and ethylaluminum dichloride, 20 parts of methanol was added to stop the cyclization reaction. All other conditions remained the same. Degree of cyclization of the cyclic structure-containing polymer, weight average molecular weight of the modified cyclic structure-containing polymer L, and the amount of maleic anhydride added and the ratio of acid anhydride group are shown in Table 13, below.

content was stirred, whereby polyisoprene was dissolved in toluene. After polyisoprene was completely dissolved, 7.2 parts of maleic anhydride was added, and the mixture was maintained at 180° C. for one hour to conduct a maleic anhydride-addition reaction. The liquid reaction mixture was poured into 3,000 parts of a solution containing 1% of 2,6-di-tert-butylphenol in acetone to deposit the maleic acid-modified polymer. The deposited polymer was collected and dried under a reduced pressure to give a maleic anhydride-modified isoprene polymer.

100 parts of the maleic anhydride-modified isoprene polymer was re-dissolved in 300 parts of toluene, and 3.6 parts of p-toluenesulfonic acid was added, and the mixture was stirred while being maintained at 85° C., to conduct a cyclization reaction. When about 5 hours elapsed, 400 parts of ion-exchanged water was added to stop the cyclization reaction. The reaction mixture was allowed to stand for 30 minutes and a separated oil layer was taken.

The oil layer was washed with 400 parts of ion-exchanged water three times, and then was poured into 1,000 parts of a solution containing 1% of 2,6-di-tert-butylphenol in methanol to deposit the maleic acid-modified cyclic structure-containing polymer. The deposited polymer was collected and dried under a reduced pressure to give a maleic anhydride-modified cyclic structure-containing isoprene polymer M. Degree of cyclization and weight average molecular weight of the modified cyclic structure-containing polymer, and the amount of maleic anhydride added and the ratio of acid anhydride group are shown in Table 13, below.

COMPARATIVE REFERENCE EXAMPLE 4

Preparation of Modified Cyclic Structure-containing Polymer N

A four-necked flask equipped with a stirrer, a thermometer, a reflux cooling condenser and a nitrogen gas-introducing tube was charged with 100 parts of polyisoprene (cis-1,4-structure isoprene units: 86%, trans-1,4-structure isoprene units: 12%, 3,4-structure isoprene units: 2%, weight average molecular weight: 136,000, cut to a size of 10 mm×10 mm square) and 1,570 parts of toluene. The inner atmosphere of the flask was substituted with nitrogen gas, and the flask was heated to 85° C. in an oil bath while the content was stirred, whereby polyisoprene was dissolved in toluene. After polyisoprene was completely dissolved, 3.9 parts of p-toluenesulfonic acid was added, and the mixture was maintained at 85° C. while being stirred to conduct a cyclization reaction. When about 5 hours elapsed, 400 parts of ion-exchanged water was added to stop the cyclization reaction. The reaction mixture was allowed to stand for 30 minutes and a separated oil layer was taken. The oil layer was washed with 400 parts of ion-exchanged water three times, and then was subjected to centrifugal separation at a number of revolution of 300 rpm to remove moisture. The oil layer was further heated at 130° C. to completely remove moisture.

While the thus-obtained liquid containing a cyclic structure-containing polymer was stirred, 2.0 parts of maleic anhydride was added to the liquid at a constant rate over a period of 5 minutes, and the reaction liquid was maintained at 160° C. for 4 hours to conduct an acid anhydride-addition reaction. Then the reaction liquid was poured into 3,000 parts of a mixed liquid of a solution containing 1% of 2,6-di-tert-butylphenol in acetone and water (the ratio of the acetone solution/water=8/2) to deposit a maleic acid-modified cyclic structure-containing polymer. The deposited polymer was collected and dried under a reduced pressure to give a maleic anhydride-modified cyclic structure-containing isoprene polymer N. Degree of cyclization and weight average molecular weight of the modified cyclic structure-containing polymer, and the amount of maleic anhydride added and the ratio of acid anhydride group are shown in Table 13, below.

For comparison, properties of the maleic anhydride-modified polymers A, B and C, prepared in Reference Examples 1 to 3, and the maleic anhydride-modified polymer E, prepared in Comparative Reference Example 1, are also shown in Table 13, below.

EXAMPLES 77-80, COMPARATIVE EXAMPLES 14-16

Preparation of Shaped Plates

Using materials shown in Table 14, three kinds of plates X, Y and Z were made by injection molding, each of which had a size of 50 mm×80 mm×3 mm. The plate Y was made by mixing the three ingredients (1), (2) and (3) by a Henschel mixer, and kneading and extruding the mixture through a twin screw extruder to form a pellet, and injection molding the pellet.

TABLE 14

| Plate specimen | Resins constituting plates |
| --- | --- |
| Molded plate X | Polypropylene resin "J-3054HP" available from Idemitsu Pet. Chem. Co., MFR: 42 g/10 min |
| Molded plate Y | (1) Polypropylene resin "J-3054HP" available from Idemitsu Pet. Chem. Co. (2) Ethylene/butane copolymer "EMB3021" available from JSR Corp. (3) Talc "JM-209" available from Asada Seifun K.K. (1)/(2)/(3) = 70/23/7 |
| Molded plate Z | Hydrogenation product of polymer made by ring-opening polymerization (ethyltetracyclododecene units: 15%, dicylopentadiene units: 85%), Tg: 103° C., Degree of hydrogenation: more than 99% |

Preparation and Evaluation of Primer

Using as binder resins the modified cyclic structure-containing polymers A, B, C, L, E, M and N, prepared in Reference Examples 1-3 and 9, and Comparative Examples 1, 3 and 4, seven kinds of primers were prepared according to the formulation shown in Table 15. That is, the ingredients according to the formulation shown in Table 15 were mixed by a high-speed stirrer (disper) for 10 minutes, and the mixture was diluted with toluene so that a fluidity corresponding to a flow down time falling within the range of 13 to 14 seconds was obtained.

Each shaped plate of X to Z was thoroughly washed with water using a spray gun having a nozzle diameter of 1.0 mm at a spraying pressure of 3.5 to 5.0 MPa, and then, dried. Each primer shown in Table 15 was sprayed onto the shaped plate so that a film with a thickness of 10 μm was formed. When 5 minutes elapsed, two-part urethane metallic coating liquid ("RB-212" base coating liquid, and "RB-288" clear coating liquid, available from Nihon Bee-Cheimical), were sprayed using the spray gun as that mentioned above so that a film with a thickness of 40 μm was formed. Thus, two-coat

TABLE 13

| | Reference Example | | | | Comp. Ref. Ex. | | |
| --- | --- | --- | --- | --- | --- | --- | --- |
| | 1 | 2 | 3 | 9 | 1 | 3 | 4 |
| Modified polymer | A | B | C | L | E | M | N |
| Wt. av. MW | 103,400 | 73,000 | 215,000 | 124,000 | 121,000 | 79,100 | 103,500 |
| Cyclization degree (%) | 83 | 78 | 68 | 53 | 26 | 79 | 83 |
| Amt. of maleic anhydride added (%) | 1.8 | 1.3 | 1.5 | 0.8 | 1.6 | 4.1 | 1.5 |
| Ratio of acid anhydride group (%) | 83 | 82 | 80 | 97 | 81 | 7 | 13 |

Wt. av. MW: Weight average molecular weight coating was conducted. The wet coating was dried at 23° C. for 15 minutes, and then at 80° C. for 30 minutes in a non-circular type drier. The dried coated plate was allowed to stand for 3 days, and the lattice pattern cutting test and the water resistant adhesion test were carried out. The results are shown in Table 15.

cyclic structure-containing polymer A and 125 parts of xylene were mixed together, and the mixture was kneaded for one hour by a sand grinder mill. The kneaded mixture was diluted with xylene so that the flow down time falls within 13 to 14 seconds to obtain a white coating liquid.

TABLE 15

|  | Example | | | | Comparative Example | | |
| --- | --- | --- | --- | --- | --- | --- | --- |
|  | 77 | 78 | 79 | 80 | 14 | 15 | 16 |
| Formulation of primer | | | | | | | |
| Kind of modified cyclized polymer | A | B | C | L | E | M | N |
| Amount of modified cyclized polymer | 15 | 25 | 15 | 20 | 25 | 20 | 20 |
| Titanium oxide | 15 | 15 | 15 | 15 | 15 | 15 | 15 |
| Carbon black | 0.1 | 0.1 | 0.1 | 0.1 | 0.1 | 0.1 | 0.1 |
| Xylene | 85 | 75 | 85 | 80 | 75 | 80 | 80 |
| Shaped Plate X | | | | | | | |
| Adhesion | 100/100 | 100/100 | 100/100 | 100/100 | 33/100 | 51/100 | 42/100 |
| Water resistant adhesion | 100/100 | 100/100 | 100/100 | 100/100 | 31/100 | 15/100 | 36/100 |
| Shaped Plate Y | | | | | | | |
| Adhesion | 100/100 | 100/100 | 100/100 | 100/100 | 52/100 | 67/100 | 50/100 |
| Water resistant adhesion | 100/100 | 100/100 | 100/100 | 100/100 | 23/100 | 22/100 | 20/100 |
| Shaped Plate Z | | | | | | | |
| Adhesion | 100/100 | 100/100 | 100/100 | 100/100 | 53/100 | 14/100 | 41/100 |
| Water resistant adhesion | 100/100 | 100/100 | 100/100 | 100/100 | 26/100 | 11/100 | 12/100 |

Adhesion and water resistant adhesion were evaluated by lattice pattern cutting test As seen from Table 15, in the case when a resin shaped article is pre-treated with (1) a primer comprising a modified cyclic structure-containing polymer E of Comparative Example 14 having a cyclization degree smaller than the range stipulated in the present invention, or (2) a primer comprising a modified cyclic structure-containing polymer M or N of Comparative Example 15 or 16 having a ratio of an acid anhydride group smaller than the range stipulated in the present invention, the resulting coating formed on the pre-treated surface have poor adhesion and water resistant adhesion.

EXAMPLE 81

Preparation of Polyester for Coating Material

A four-necked flask equipped with a stirrer, a thermometer, a reflux cooling condenser and a nitrogen gas-introducing tube was charged with 800 parts of terephthalic acid, 770 parts of 2-butyl-2-ethyl-1,3-propanediol, 72.7 parts of pentaerythritol and 0.80 part of monobutyltin oxide. While the content was stirred and nitrogen gas was introduced, the content was heated to conduct a reaction. That is, the temperature of the content was elevated from 200° C. to 240° C. over a period of 6 hours during which a reaction was conducted while part of unreacted monomer and water produced during the reaction are removed. Thereafter, the reaction was continued for 3 hours while dehydration was carried out at 240° C. under a reduced pressure of 50 mmHg. The thus-obtained polyester had a weight average molecular weight of 43,000, an acid value of 0.35 mgKOH/g and a hydroxyl value of 46 mgKOH/g.

Preparation of Coating Liquid 50 parts of the above-mentioned polyester, 30 parts of titanium oxide as white pigment, 25 parts of the modified The above-mentioned shaped plate X was washed with water and thereafter, the white coating liquid was sprayed on the plate X so that the thickness of coating formed on the plate X was 40 μm as a dry film. The wet coating was dried at 23° C. for 15 minutes, and then at 80° C. for 30 minutes in a non-circulation type drier. After the coated plate was allowed to stand at room temperature for 7 days, a lattice pattern cutting test, a water resistant adhesion test and an accelerated weathering test were carried out. Test results are shown in Table 16.

TABLE 16

|  | Example | | Comp. Ex. |
| --- | --- | --- | --- |
|  | 81 | 82 | 17 |
| Formulation of coating liquid | | | |
| Modified cyclized polymer A | 25 | — | — |
| Modified cclized polymer B | — | 25 | — |
| Modified cyclized polymer E | — | — | 25 |
| Adhesion (lattice pattern cutting test) | 100/100 | 100/100 | 45/100 |
| Water resistant adhesion (lattice pattern cutting test) | 100/100 | 100/100 | 33/100 |
| Accelerated weathering test (luster retention %) | | | |
| For 0 hour | 100 | 100 | 100 |
| 100 hours | 97 | 98 | 97 |
| 250 hours | 95 | 96 | 94 |
| 480 hours | 94 | 94 | 91 |

As seen from Table 16, a coating liquid comprising a modified cyclic structure-containing polymer E of Comparative Example 17 having a cyclization degree smaller than the range stipulated in the present invention has poor adhesion and water resistant adhesion to a polyolefin resin shaped article. In contrast, a coating liquid comprising a modified cyclic structure-containing containing polymer comprising a modified cyclic structure-containing polymer of Example 81 or 82 having a cyclization degree falling within the range stipulated in the present invention exhibits good adhesion and water resistant adhesion to a polyolefin resin shaped article, and gives a coating exhibiting good luster retention for a long period of time.

INDUSTRIAL APPLICABILITY

In the shaped composite article of the present invention, a substrate and an adherend, which are comprised of different materials, are strongly bonded together through a layer of an adhesive composition comprising as the main ingredient a cyclic structure-containing conjugated diene polymer (i) or a modified cyclic structure-containing conjugated diene polymer (ii). Even when at least one of the substrate and the adherend is comprised of a non-polar hydrocarbon polymer, the adhesion is strong.

Therefore, the shaped composite article of the present invention can be used in various fields, which include electrical and electric parts, information recording mediums, optical parts, machine parts, automobile parts, packaging materials, and construction materials. More specifically, the shaped composite materials are especially suitable for electrical and electronic parts for liquid crystal displays, plasma displays and organic electroluminescence displays; electric parts for circuit boards, semiconductor elements and connectors; information recording mediums such as optical discs, magnetic discs and hard discs; optical parts such as optical lenses, optical fibers, phase plates, diffuse plates and deflector plates; automobile parts such as vehicle light instruments, vehicle displays and indicators, automobile interior and exterior parts; vessels for medicines; food containers, cosmetic containers, tableware; packaging materials such as packaging films, packaging packs, shrink films (label films); and construction materials such as waterproof sheet, sealing sheet and piping materials.

The coating material of the present invention comprising the modified cyclic structure-containing conjugated diene polymer (ii') exhibits good adhesion and good water resistant adhesion to various resin articles, especially for polyolefin resin shaped articles. Therefore the coating material is suitable for a coating liquid, an ink, an adhesive and a primer.

The invention claimed is:

1. A modified conjugated diene polymer having cyclic structures within the molecule which has a degree of cyclization in the range of 30 to 95%, and having added thereto 0.1 to 10% by weight of an α,β-ethylenically unsaturated dicarboxylic acid anhydride, and the ratio of {amount of (I)/[amount of (I)+amount of (II)} is at least 60% by weight, wherein (I) is an acid anhydride group added and (II) is a dicarboxylic acid group formed by hydrolysis of an acid anhydride group (I).

2. The modified conjugated diene polymer having cyclic structures according to claim 1, which has a weight average molecular weight in the range of 5,000 to 600,000 as measured by gel permeation chromatography and as expressed in terms of that of polystyrene.

3. The modified conjugated diene polymer having cyclic structures according to claim 1, wherein the modified conjugated diene polymer having cyclic structures has a degree of cyclization in the range of 50 to 90%, and having added thereto 0.2 to 8% by weight of an α,β-ethylenically unsaturated dicarboxylic acid anhydride, and the ratio of {amount of (I)/[amount of (I)+amount of (II)]} is at least 70% by weight, wherein (I) is an acid anhydride group added and (II) is a dicarboxylic acid group formed by hydrolysis of the acid anhydride groups (I).

4. The modified conjugated diene polymer having cyclic structures according to claim 1, wherein base polymers, from which the modified conjugated diene polymer having cyclic structures are made, are a homopolymer or copolymer comprising units derived from at least one kind of monomer selected from 1,3-butadiene and isoprene, or a copolymer comprising at least 70% by weight of units derived from at least one kind of monomer selected from 1,3-butadiene and isoprene and not more than 30% by weight of units derived from an aromatic vinyl monomer.

5. The modified conjugated diene polymer having cyclic structures according to claim 1, wherein the modified conjugated diene polymer having cyclic structures is obtained by a process wherein a conjugated diene polymer is cyclized, and then, the thus-obtained conjugated diene polymer having cyclic structures is subjected to a reaction of adding an α,β-ethylenically unsaturated dicarboxylic acid anhydride to the conjugated diene polymer having cyclic structures.

6. The modified conjugated diene polymer having cyclic structures according to claim 1, wherein the α,β-ethylenically unsaturated dicarboxylic acid anhydride is maleic anhydride.

7. A process for producing a modified conjugated diene polymer having cyclic structures as claimed in claim 1, which comprises the steps of:
    contacting a conjugated diene polymer with a cyclization catalyst in an inert reaction medium to carry out an internal cyclization reaction;
    allowing the thus-obtained conjugated diene polymer having cyclic structures to react with an α,β-ethylenically unsaturated dicarboxylic acid anhydride in the absence of water to carry out an addition reaction of the acid anhydride to the conjugated diene polymer having cyclic structure; and,
    collecting the thus-obtained modified conjugated diene polymer having cyclic structures in the absence of water.

8. A shaped composite article comprising a substrate and an adherend, wherein the adherend is adhered onto the substrate through a layer of an adhesive composition comprising as the main ingredient the modified conjugated diene polymer having cyclic structures as claimed in claim 1.

9. The shaped composite article according to claim 8, wherein one of the substrate and the adherend is a shaped article comprised of a hydrocarbon polymer having a solubility parameter value in the range of 7.8 to 9.0 $(cal/cm^3)^{1/2}$, and the other of the substrate and the adherend is a shaped article comprised of a hydrocarbon polymer having a sp value in the range of 9.5 to 15.5 $(cal/cm^3)^{1/2}$.

10. The shaped composite article according to claim 8, wherein one of the substrate and the adherend is a shaped article comprised of a hydrocarbon polymer, and the other of the substrate and the adherend is a shaped article comprised of a different material other than a hydrocarbon polymer.

11. The shaped composite article according to claim 8, wherein one of the substrate and the adherend is a shaped article comprised of a non-polar hydrocarbon polymer, and the other of the substrate and the adherend is a shaped article comprised of a different material selected from metals, ceramics and natural high-molecular weight polymers.

12. The shaped composite article according to claim 8, wherein one of the substrate and the adherend is a shaped article comprised of an olefin polymer, and the other of the substrate and the adherend is a coating layer formed from a coating liquid.

13. The shaped composite article according to claim 8, wherein one or both of the substrate and the adherend are a sheet-form shaped article.

14. A coating material comprising the modified conjugated diene polymer having cyclic structures as claimed in claim 1.

15. The coating material according to claim 14, which is an adhesive, a primer, a coating liquid or an ink.

* * * * *